(12) United States Patent
Sasaki

(10) Patent No.: US 7,572,070 B2
(45) Date of Patent: Aug. 11, 2009

(54) OPTICAL DEVICE AND MANUFACTURING METHOD THEREOF

(75) Inventor: Seimi Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/777,343

(22) Filed: Jul. 13, 2007

(65) Prior Publication Data

US 2008/0025677 A1    Jan. 31, 2008

(30) Foreign Application Priority Data

Jul. 26, 2006 (JP) .................... 2006-203606

(51) Int. Cl.
*G02B 6/42* (2006.01)
(52) U.S. Cl. .............. 385/94; 385/88; 385/92
(58) Field of Classification Search .......... None
See application file for complete search history.

(56) References Cited

U.S. PATENT DOCUMENTS

| | | | | |
|---|---|---|---|---|
| 4,591,711 A | * | 5/1986 | Taumberger | 250/227.24 |
| 5,444,804 A | * | 8/1995 | Yui et al. | 385/49 |
| 5,664,043 A | * | 9/1997 | Donaldson et al. | 385/138 |
| 5,812,716 A | * | 9/1998 | Ohishi | 385/92 |
| 5,850,495 A | * | 12/1998 | O'Donnell | 385/52 |
| 6,296,400 B1 | | 10/2001 | Uchiyama | 385/94 |
| 6,435,736 B1 | * | 8/2002 | Irie et al. | 385/92 |
| 6,769,819 B2 | | 8/2004 | Tanaka et al. | 385/92 |
| 7,258,495 B1 | * | 8/2007 | Hughes et al. | 385/93 |
| 2006/0104575 A1 | | 5/2006 | Ikeda et al. | 385/88 |

FOREIGN PATENT DOCUMENTS

| | | |
|---|---|---|
| JP | 2000-352644 | 12/2000 |
| JP | 2001-154064 | 6/2001 |
| JP | 2001-281498 | 10/2001 |
| JP | 2006-119373 | 5/2006 |

* cited by examiner

*Primary Examiner*—Sung H Pak
*Assistant Examiner*—Mike Stahl
(74) *Attorney, Agent, or Firm*—Fujitsu Patent Center

(57) ABSTRACT

The present invention is an optical device achieving miniaturization, functional integration, and cost reduction, and comprises an optical element chip, an optical fiber assembly comprised of an optical fiber, a first ferrule, and a second ferrule, a package containing and enveloping the optical element chip and having an opening for introducing the optical fiber assembly, and a support pipe mounted on an extension of the opening to support an introductory part of the optical fiber into the package together with the second ferrule constituting the optical fiber assembly to be introduced into the package and to hermetically seal the package, wherein the second ferrule is fixed inside the support pipe, one end thereof protrudes toward an inner part of the package, and another end substantially protrudes at a tip part of the support pipe by a length required for the airtight fixing.

13 Claims, 7 Drawing Sheets

OPTICAL DEVICE AND MANUFACTURING METHOD THEREOF

BACKGROUND OF THE INVENTION

1) Field of the Invention

The present invention relates to an optical device used in an optical communication system such as wavelength division multiplex transmission, and particularly to an optical device in which an optical waveguide chip is contained in a package and a manufacturing method thereof.

2) Description of the Related Art

With widespread use of the Internet, mobile phones, and advanced features of terminal equipment, increasing transmission capacity is a mandatory challenge. Thus, communication networks are becoming increasingly dependent on optical fibers capable of high-speed, large-capacity transmission, and thus construction and maintenance of optical communication networks using WDM (Wavelength Division Multiplexing) is urgently needed.

FIG. 13 is a block diagram exemplifying an optical transmitter performing transmission of optical signals in a WDM transmission system. Numeral 101 denotes an optical fiber outputting optical signals, numeral 102 denotes an optical modulator connected to the optical fiber 101, and numeral 103 denotes a light source part comprised of a semiconductor laser 103a optically connected to the optical modulator 102 and a temperature control device 103b controlling temperature of the semiconductor laser 103a. Further, numeral 104 denotes a driving part comprised of an LD driving circuit 104a and an LD temperature control circuit 104b, and numeral 105 denotes an optical modulator driving circuit.

The semiconductor laser (made of a laser diode, for example, and called "LD" below) 103a used as a light source is driven by the LD driving circuit 104a whose temperature is controlled by the temperature control device 103b receiving a control signal from the LD temperature control circuit 104b to control optical power and oscillation wavelengths to fixed values.

The optical modulator 102 is an external optical modulator and is constructed of an optical waveguide chip using a substrate made of material having an electro-optical effect such as $LiNbO_3$ (called "LN" below) Electrodes are provided near the optical waveguide and an output light (continuous light) from an LD is modulated in intensity by an electric signal applied to the electrodes to generate an optical signal in pulse forms before being transmitted to the optical fiber 101.

Miniaturization, advanced features, and cost reduction of such an optical transmitter described above have been strongly demanded with widespread use of WDM communication in recent years, and a demand for an optical modulator constituting the optical transmitter is no exception.

In such a backdrop, realization of (a) miniaturization by making an optical fiber shorter and (b) advanced features by making an optical fiber multi-core (multi-channel) concerning particularly a connection structure of an optical fiber has been demanded to achieve miniaturization and advanced features of optical waveguide devices including optical modulators. Cost reduction of optical waveguide devices by achieving simplification of assembly has also been keenly called for.

A configuration of a combined system of an optical waveguide and optical fiber in optical waveguide devices including optical modulators is exemplified for example by Patent Document 1 shown below. FIG. 14 shows an outline of a configuration example of an optical waveguide device 110 described in Patent Document 1.

As shown in FIG. 14, an opening 114 for passing an optical fiber 113 to the outside is provided on a sidewall of a package 112 containing an optical waveguide chip 111, and a pipe 115 is fixed airtightly around the opening 114. Then, the optical waveguide chip 111 and the optical fiber 113 are fixed by an adhesive via a first ferrule 116 and the optical fiber 113 is airtightly fixed to a second ferrule 117 at an introduction location to the inside of the package 112 through the pipe 115. Further, the second ferrule 117 is held by the pipe 115 and airtightly fixed at a tip of the pipe 115.

The optical waveguide device 110 described above is constructed by inserting the optical fiber 113 with the first ferrule 116 and the second ferrule 117 provided on the optical fiber 113 (the optical fiber 113 with the first ferrule 116 and the second ferrule 117 positioned on the optical fiber 113) through the pipe 115 airtightly fixed to the package 112 and connecting the first ferrule 116 to the optical waveguide chip 111.

At this point, the connection structure of an optical fiber, such as material selection and dimensions of each element, is designed under conditions of [1] matching thermal expansion, [2] securing an allowable bending radius of the optical fiber, [3] securing hermetic sealing, and [4] securing nose strength.

Here, concerning [1] matching thermal expansion, heat is added in a manufacturing process to an optical waveguide device in which the optical fiber 113 is connected to the optical waveguide chip 111 mounted in the package 112 to cause an adhesive used for connection to set, and material and dimensions of each part are designed in such a way that a first amount of expansion or contraction caused by thermal expansion of part a of the package 112 in FIG. 14 and thermal expansion of part b of the pipe 115, and a second amount of expansion or contraction caused by thermal expansion of part c of the optical fiber 113 and thermal expansion of part d of the second ferrule 117 match. No tensile stress or compressive stress caused by thermal expansion or contraction will thereby be applied to a connection (fixed) part of the optical waveguide chip 111 and the optical fiber 113 by thermal expansion or contraction to stabilize conduction characteristics of the optical fiber 113 even if heat is added.

Also, concerning [2] securing an allowable bending radius of the optical fiber, the bending radius of the optical fiber 113 is secured by setting member accuracy so that desired relative position accuracy of a position (an adhesion position with the optical waveguide) of the first ferrule 116 and that of a position (a position of the pipe 115 of the package 112) of the second ferrule 117 are attained to suppress a loss by bending of the optical fiber 113 to allowable limits.

That is, it is desired that a portion of the optical fiber 113 between the first ferrule 116 and the second ferrule 117 where the optical fiber 113 itself is exposed is in a straight line if possible. However, it is difficult to maintain the optical fiber 113 in a straight line based on accuracy of a positional relationship when the first ferrule 116 and the second ferrule 117 are provided on the optical fiber 113 and accuracy of a positional relationship of the optical waveguide chip 111 mounted in the package 112 relative to the pipe 115, and therefore a loss is controlled to allowable limits by making the exposed portion of the optical fiber 113 longer to some extent so that, even if the optical fiber 113 is bent, a bending angle of the optical fiber 113 becomes greater.

Further, concerning [3] securing hermetic sealing, hermetic sealing of the package 112 is secured by airtightly fixing a portion (See a portion B in FIG. 14) where the optical fiber 113 and the second ferrule 117 are fixed, a portion (See a portion C in FIG. 14) where the package 112 and the pipe 115 are fixed, and a portion (See a portion A in FIG. 14) where the tip of the pipe 115 and the second ferrule 117 are fixed to stabilize operations of the mounted optical waveguide chip 111.

Also, concerning [4] securing nose strength, nose strength is secured by firmly fixing the pipe through blazing of the package 112 and the pipe 115 and inserting the second ferrule 117 into the pipe 115 substantially without gap to hold the second ferrule 117 by the pipe 115.

As additional conventional techniques related to the present invention, those described in Patent Document 2 to Patent Document 4 are known.

[Patent Document 1] Japanese Patent Laid-Open No. 2006-119373

[Patent Document 2] Japanese Patent Laid-Open No. 2001-154064

[Patent Document 3] Japanese Patent Laid-Open No. 2000-352644

[Patent Document 4] Japanese Patent Laid-Open No. 2001-281498

Nevertheless, problems shown below have inhibited the realization of the above-mentioned (a) miniaturization by making an optical fiber shorter and (b) advanced features by making an optical fiber multi-core (multi-channel) in the above-mentioned optical waveguide device 110 shown in FIG. 14.

That is, the position of the first ferrule 116 and that of the second ferrule 117 are determined by the position of the optical waveguide chip 111 and that of the pipe 115 respectively in the optical waveguide device 110 shown in FIG. 14, but if there is any deviation of positions of both, the optical fiber 113 will be bent (deflected).

Making the length of the above-described exposed portion of the optical fiber 113 shorter as much as possible contributes to miniaturization of the package 112, and eventually to miniaturization of the optical waveguide device 110. However, as described above, bending (deflection) of the optical fiber 113 caused by a deviation of the positional relationship when the first ferrule 116 and the second ferrule 117 are provided on the optical fiber 113 from that of the optical waveguide chip 111 mounted in the package 112 relative to the pipe 115 will be larger as the length of the exposed portion of the optical fiber 113 becomes shorter even if the deviation is slight.

Therefore, at least the positions of the optical waveguide chip and pipe must be determined with very high accuracy to make the optical fiber 113 shorter for miniaturization of a package 112 scale and to secure the allowable bending radius. However, since there is naturally a limit to dimensional accuracy of components and positioning accuracy of assembly, there has also been a limit when making the optical fiber 113 shorter (that is, miniaturization of the package 112).

Further, if, when the optical fiber is made multi-core, a deviation in a tilt (oscillation) direction with respect to an optical axis is added to a relative position of the first ferrule 116 and the second ferrule 117, the optical fiber 113 is easily buckled (pushed down). To suppress "bending (deflection) by buckling" to make the optical fiber have a radius equal to or larger than the allowable bending radius, the tilt (oscillation) direction of the first ferrule 116 and the second ferrule 117 must be positioned with high accuracy.

However, there has naturally been a limit when pursuing very high accuracy on component dimensions and assembly, which are factors of the tilt (oscillation) such as an end face angle of the first ferrule 116 and an inclination of the pipe 115. Thus, both of the above-described "bending (deflection) by position deviation" and "bending (deflection) by buckling" must be considered to make the optical fiber 113 multi-core.

Techniques described in Patent Document 2 to Patent Document 4 do not mention any technique that could make the optical fiber shorter by increasing positioning accuracy.

SUMMARY OF THE INVENTION

The present invention has been made in view of problems of conventional techniques described above and an object thereof is to achieve miniaturization, functional integration, and cost reduction of an optical device.

Thus, an optical device in the present invention is an optical device that comprises: an optical element chip on which an optical element is formed; an optical fiber assembly comprised of an optical fiber adapted to optically connect to the optical element, a first ferrule mounted at a tip of the optical fiber to connect and fix the optical element and the optical fiber, and a second ferrule mounted on the optical fiber on an inner side from the first ferrule; a package containing and enveloping the optical element chip and having an opening for introducing the optical fiber assembly; and a support pipe mounted on an extension of the opening to support an introductory part of the optical fiber into the package together with the second ferrule constituting the optical fiber assembly to be introduced into the package and to hermetically seal the package, wherein the second ferrule is fixed inside the support pipe, one end thereof protrudes toward an inner part of the package, and another end substantially protrudes at a tip part of the support pipe by a length required for the airtight fixing.

In this case, the first ferrule and the second ferrule may also be constructed so that a portion of an external diameter ridgeline of the first ferrule and that of the second ferrule inside the package are in contact with an identical reference plane.

Also, an optical device in the present invention is an optical device that comprises: an optical element chip on which an optical element is formed; an optical fiber assembly comprised of an optical fiber adapted to optically connect to the optical element, a first ferrule mounted at a tip of the optical fiber to connect and fix the optical element and the optical fiber, a second ferrule mounted on the optical fiber on an inner side from the first ferrule, and an enveloping pipe mounted on the second ferrule on the side of the first ferrule to envelop the optical fiber; a package containing and enveloping the optical element chip and having an opening for introducing the optical fiber assembly; and a support pipe mounted on an extension of the opening to support an introductory part of the optical fiber into the package together with the second ferrule constituting the optical fiber assembly to be introduced into the package and to hermetically seal the package, where in the second ferrule is fixed inside the support pipe, one end thereof substantially protrudes at a tip part of the support pipe by a length required for the airtight fixing, and the enveloping pipe protrudes toward the inner part of the package.

In this case, the first ferrule and the enveloping pipe may also be constructed so that a portion of an external diameter ridgeline of the first ferrule and that of the enveloping pipe inside the package are in contact with an identical reference plane.

Also, an optical device in the present invention is an optical device that comprises: an optical waveguide chip on which an optical waveguide is formed, an optical fiber optically connected to the optical waveguide, a first ferrule to connect and fix the optical waveguide chip and the optical fiber, a package containing the optical waveguide chip and the first ferrule and having an opening for passing the optical fiber to an outside provided on a sidewall, a first pipe airtightly fixed around the opening, and a second ferrule that is inserted into the first pipe to be airtightly fixed to a tip of the first pipe and through which the optical fiber passing through the opening to come out of the package is inserted for airtight fixing, wherein the second ferrule has an external diameter smaller than an internal diameter of the first pipe, and also has a sufficient length so that a portion thereof protrudes toward the inner part of the package and substantially protrudes from the first pipe by a length required for the airtight fixing.

Also, an optical device in the present invention is an optical device that comprises: an optical waveguide chip on which an optical waveguide is formed, an optical fiber optically connected to the optical waveguide, a first ferrule to connect and fix the optical waveguide chip and the optical fiber, a package containing the optical waveguide chip and the first ferrule and having an opening for passing the optical fiber to an outside provided on a sidewall, a first pipe airtightly fixed around the opening, a second ferrule that has an external diameter smaller than an internal diameter of the first pipe and is inserted into the first pipe to be airtightly fixed to a tip of the first pipe and through which the optical fiber passing through the opening to come out of the package is inserted for airtight fixing, and a second pipe mounted at a tip part of the second ferrule leading to the inner part of the package, wherein the second ferrule has the external diameter smaller than the internal diameter of the first pipe, and the second pipe has a sufficient length so that at least a portion thereof protrudes from an inner wall of the package and the second ferrule is sufficiently long so that a length required for the airtight fixing substantially protrudes from the first pipe.

Further, a method of manufacturing an optical device in the present invention is a method of manufacturing an optical device, the device comprising: an optical element chip on which an optical element is formed; an optical fiber assembly comprised of an optical fiber adapted to optically connect to the optical element, a first ferrule mounted at a tip part of the optical fiber to connect and fix the optical element and the optical fiber, and a second ferrule mounted on the optical fiber on an inner side from the first ferrule; a package containing and enveloping the optical element chip and having an opening for introducing the optical fiber assembly; and a support pipe mounted on an extension of the opening to support an introductory part of the optical fiber into the package together with the second ferrule constituting the optical fiber assembly to be introduced into the package and to hermetically seal the package, wherein the second ferrule is fixed inside the support pipe, one end thereof protrudes toward the inner part of the package, and another end substantially protrudes at a tip part of the support pipe by a length required for the airtight fixing; the method comprising the steps of: assembling the optical fiber assembly by fixing the first ferrule, the optical fiber, and the second ferrule; inserting the optical fiber assembly into the package containing the optical element chip from the support pipe, and making optical axis adjustments of the optical element chip and the optical fiber by gripping the first ferrule and the second ferrule simultaneously so that the optical fiber has a radius equal to or greater than an allowable bending radius; fixing the optical element chip and the first ferrule after making the optical axis adjustments; and airtightly fixing the second ferrule to a tip of the support pipe while maintaining a position after the optical axis adjustments.

In this case, the first ferrule and the second ferrule are fixed to the optical fiber in a state in which a portion of an external diameter ridgeline of the first ferrule and that of the second ferrule are in contact with an identical reference plane when assembling the optical fiber assembly, and optical axis adjustments of the optical element chip and the optical fiber are made while the first ferrule and the second ferrule are gripped inside the package to maintain a state in which a portion of the external diameter ridgeline of the first ferrule and that of the second ferrule are in contact with the identical reference plane after inserting the optical fiber assembly into the package.

Also, the first ferrule and the second ferrule may be fixed to the optical fiber in a state in which both ferrules are simultaneously gripped using a jig having a preset reference plane when assembling the optical fiber assembly, and also the optical axis adjustments may be made while the first ferrule and the second ferrule are gripped inside the package simultaneously using the jig when connecting the optical fiber constituting the optical fiber assembly to the optical element.

Further, in this case, the optical fiber can be made to have a multi-core array structure with the reference plane being a plane substantially perpendicular to an alignment direction of a plurality of cores constituting the multi-core array.

Also, a method of manufacturing an optical device in the present invention is a method of manufacturing an optical device, the device comprising: an optical element chip on which an optical element is formed; an optical fiber assembly comprised of an optical fiber adapted to optically connect to the optical element, a first ferrule mounted at a tip part of the optical fiber to connect and fix the optical element and the optical fiber, a second ferrule mounted on the optical fiber on an inner side from the first ferrule, and an enveloping pipe mounted on the second ferrule on the side of the first ferrule to envelop the optical fiber; a package containing and enveloping the optical element chip and having an opening for introducing the optical fiber assembly; and a support pipe mounted on an extension of the opening to support an introductory part of the optical fiber into the package together with the second ferrule constituting the optical fiber assembly to be introduced into the package and to hermetically seal the package, wherein the second ferrule is fixed inside the support pipe, one end thereof substantially protrudes at a tip part of the support pipe by a length required for the airtight fixing, and the enveloping pipe protrudes toward the inner part of the package, the method comprising the steps of: assembling the optical fiber assembly by fixing the first ferrule, the optical fiber, and the second ferrule to which the enveloping pipe is mounted; inserting the optical fiber assembly into the package containing the optical element chip from the support pipe airtightly fixed around the opening, and making optical axis adjustments of the optical element chip and the optical fiber by gripping the first ferrule and the enveloping pipe simultaneously so that the optical fiber has a radius equal to or greater than an allowable bending radius; fixing the optical element chip and the first ferrule after making the optical axis adjustments; and airtightly fixing the second ferrule to a tip of the support pipe while maintaining a position after the optical axis adjustments.

In this case, the first ferrule and the enveloping pipe may be fixed in a state in which a portion of an external diameter ridgeline of the first ferrule and that of the enveloping pipe are in contact with an identical reference plane when assembling the optical fiber assembly, while making optical axis adjustments of the optical element chip and the optical fiber by gripping the first ferrule and the enveloping pipe inside the package to maintain a state in which a portion of the external diameter ridgeline of the first ferrule and that of the enveloping pipe are in contact with the identical reference plane after inserting the optical fiber assembly into the package.

Also, the first ferrule and the enveloping pipe may be fixed to the optical fiber in a state in which both the ferrule and enveloping pipe are simultaneously gripped using a jig having a preset reference plane when assembling the optical fiber assembly, while making the optical axis adjustments by gripping the first ferrule and the enveloping pipe inside the package simultaneously using the jig when connecting the optical fiber constituting the optical fiber assembly to the optical element.

Further, the optical fiber may have a multi-core array structure with the reference plane being a plane substantially perpendicular to an alignment direction of a plurality of cores constituting the multi-core array.

According to the present invention, the second ferrule is fixed inside the support pipe, one end thereof is constructed to protrude toward the inner part of the package, and another end is constructed to substantially protrude at a tip part of the support pipe by a length required for the airtight fixing, and therefore when optical axis adjustments are made by connecting the optical fiber assembly in which the first ferrule is fixed to the optical fiber together with the second ferrule to the optical waveguide chip, the first ferrule and the second ferrule can be gripped directly and simultaneously inside the package. Consequently, the allowable bending radius of the optical fiber can reliably be secured even if the optical fiber is made shorter to reduce the size of optical waveguide device, and thus optical axis adjustment work itself can be simplified while achieving reduced device size and integration as an optical waveguide device, contributing to reduction in manufacturing costs as an optical waveguide device as well.

Also, according to the present invention, the second ferrule is fixed inside the support pipe, one end thereof is constructed to substantially protrude at a tip part of the support pipe by a length required for airtight fixing, and the enveloping pipe is constructed to protrude toward the inner part of the package, and therefore when optical axis adjustments are made by connecting the optical fiber assembly in which the first ferrule is fixed to the optical fiber together with the second ferrule on which the second pipe is mounted to the optical waveguide chip, the first ferrule and the second pipe can be gripped directly and simultaneously inside the package. Consequently, the allowable bending radius of the optical fiber can reliably be secured even if a distance between a connection surface of the optical waveguide chip and first ferrule and the opening position of the package is made shorter to reduce the size of the optical waveguide device, and thus optical axis adjustment work itself can be simplified while achieving reduced device size and integration as an optical waveguide device, contributing to reduction in manufacturing costs as an optical waveguide device as well.

DESCRIPTION OF THE PREFERRED EMBODIMENTS

Embodiments of the present invention will be described below with reference to drawings.

In addition to objects of the present invention described above, other technical problems, means for solving such technical problems, and working effects will be clear from disclosures of the embodiments shown below.

[A] Description of the First Embodiment

Figure 1:
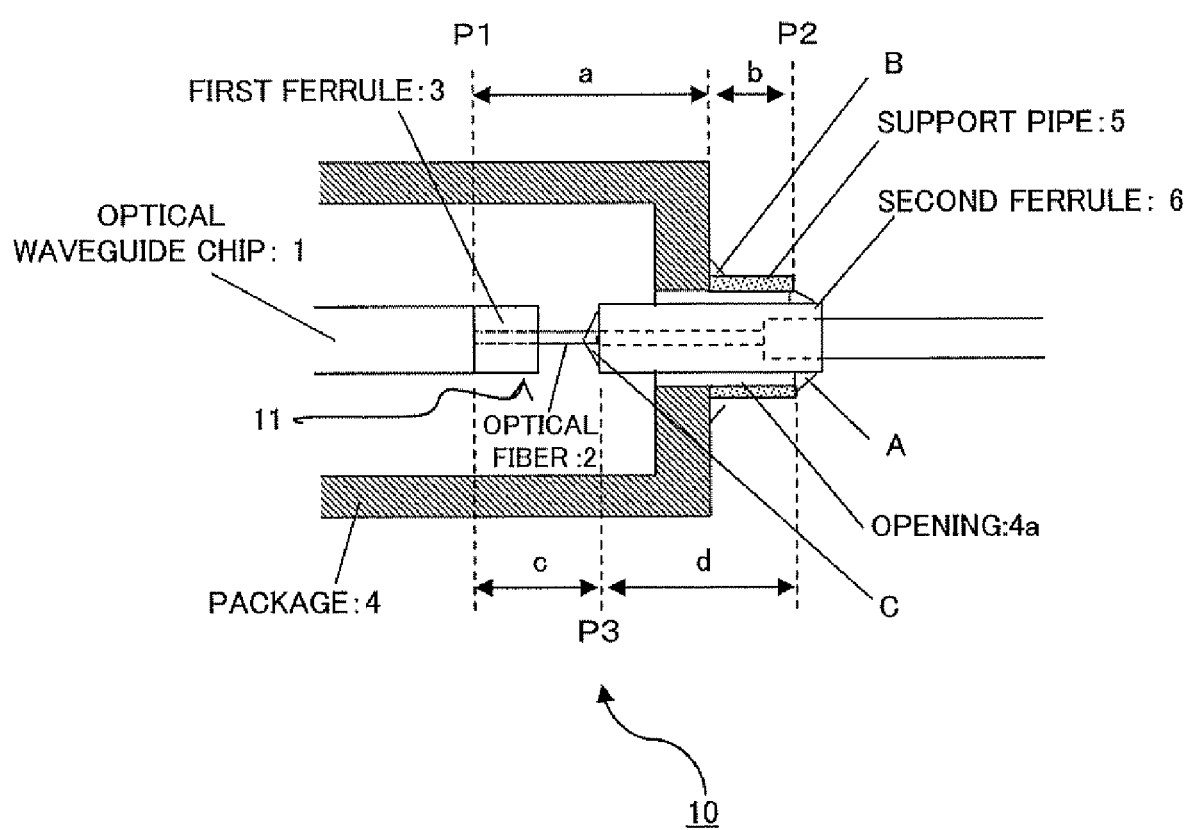
FIG. 1 is a schematic top view showing an optical waveguide device according to a first embodiment of the present invention.

FIG. 1 is a schematic top view showing an optical waveguide device 10 according to the first embodiment of the present invention and shows the optical waveguide device 10 by focusing particularly on conduction connection of an optical waveguide chip 1 constituting the optical waveguide device 10 and an optical fiber 2 leading to the outside of a package 4. The optical waveguide device 10 shown in FIG. 1 comprises the optical waveguide chip 1, the optical fiber 2, a first ferrule 3, the package 4, a support pipe (first pipe) 5, and a second ferrule 6.

Figure 13:
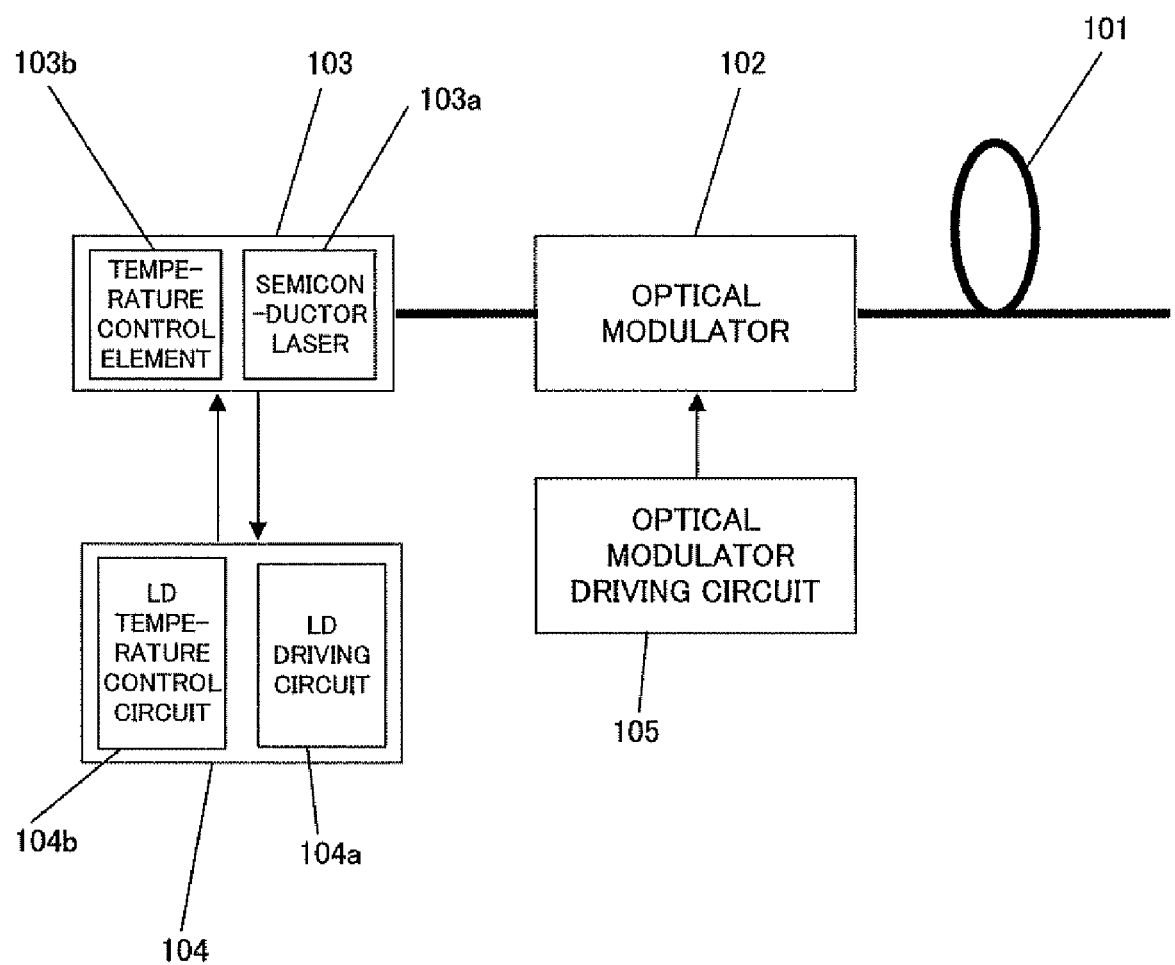
FIG. 13 and FIG. 14 are diagrams showing conventional techniques.

Here, the optical waveguide chip 1 is, for example, an LN substrate chip on which an optical waveguide is formed as an optical element and can be applied, for example, as a light modulation element chip (optical element chip) (See numeral 102 in FIG. 13) that performs light modulation of input light. The optical fiber 2 is optically connected to the optical waveguide constituting the optical waveguide chip 1, and can cause light from the optical waveguide to propagate to the optical fiber 2 or guide light propagated through the optical fiber 2 to the optical waveguide.

Further, the first ferrule 3 connects and fixes the optical waveguide chip 1 and the optical fiber 2 via a UV adhesive or the like and, for example, a glass member can be used as the first ferrule 3. The package 4 is a housing containing and enveloping the optical waveguide chip 1. The package 4 also contains the first ferrule 3 and has an opening 4a for passing the optical fiber 2 to the outside provided on a sidewall. Material whose thermal expansion coefficient is approximately equal to that of the optical waveguide chip 1 can preferably be selected as a material of the package 4.

The opening 4a is provided at a location in the package 4 where the optical fiber 2 is introduced and the hollow support pipe 5 is fixed to an extension of the opening 4a. The support pipe 5 and the package 4 are hermetically sealed by brazing (See A in FIG. 1). Further, the second ferrule 6 is airtightly fixed to a tip (See B in FIG. 1) of the support pipe 5 by solder or the like after being inserted into the support pipe 5 and through which the optical fiber 2 passing through the opening 4a to come out of the package 4 is inserted. The second ferrule 6 and the optical fiber 2 are airtightly fixed inside the package 4 (See C in FIG. 1).

More specifically, the second ferrule 6 is constructed to be insertable without substantial gap, though the external diameter thereof is smaller than the internal diameter of the support pipe 5, and the length thereof is set so that a portion thereof protrudes toward the inner part of the package 4 and the second ferrule 6 substantially protrudes from the support pipe 5 by a length required for airtight fixing. In other words, the second ferrule 6 has the length stretching along a direction in which the optical fiber 2 passes through from the position of protrusion by the amount required for airtightly fixing to the support pipe 5 through thickness of the package 4 to the position where a portion of the second ferrule 6 protrudes toward the inner part of the package 4. Meanwhile, a metallic member can be used as the second ferrule 6.

Therefore, an optical fiber assembly 11 is comprised of the optical fiber 2 adapted to optically connect to the above-described optical waveguide, the first ferrule 3 mounted at the tip of the optical fiber 2 to connect and fix the optical waveguide and the optical fiber 2, and the second ferrule 6 mounted on the optical fiber 2 on an inner side from the first ferrule 3.

Then, the above-described optical fiber assembly 11 is introduced through the opening 4a of the package 4 during production, and the support pipe 5 mounted on the extension of the opening 4a supports the introductory part of the optical fiber 2 into the package 4 together with the second ferrule 6 constituting an optical fiber assembly 7 to be introduced into the package 4 and hermetically seals the package 4.

The optical waveguide device 10 constructed as described above is manufactured, for example, as described below.

Figure 2:
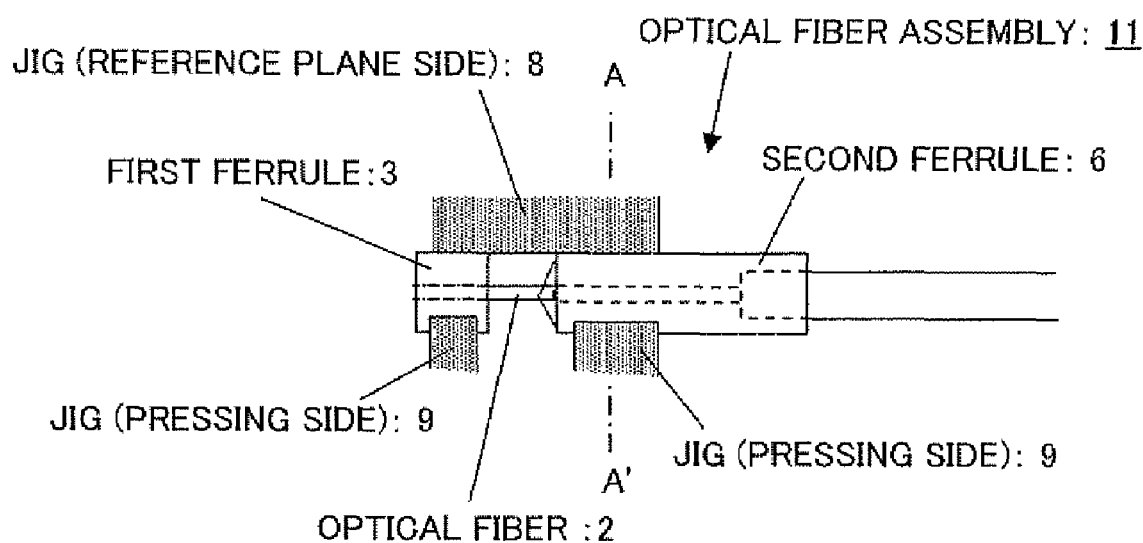
FIG. 2 and FIG. 3 are both diagrams for describing manufacturing processes of the optical waveguide device according to the first embodiment of the present invention.

First, as shown in FIG. 2, the optical fiber assembly 11 is assembled by fixing the first ferrule 3, the optical fiber 2, and the second ferrule 6. The package 4 in which the support pipe 5 is fixed to the opening 4a has the optical waveguide chip 1 mounted. More specifically, an entire back surface of the optical waveguide chip 1 excluding areas near incoming/outgoing end faces is adhesion-fixed to the package 4 by an epoxy adhesive or the like.

At this point, the first ferrule 3 is positioned at a tip of the optical fiber 2 and the second ferrule 6 is inserted by the optical fiber 2 on the inner side from the first ferrule 3. The second ferrule 6 is fixed with a distance from the tip position of the optical fiber 2 so as to match a relationship between a mounting position of the optical waveguide chip 1 described above and a tip position of the support pipe 5 on an outer side of the package 4. Further, the first ferrule 3 and second ferrule 6 are constructed so that a portion of the external diameter ridgeline of the first ferrule 3 and that of the second ferrule 6 inside the package 4 are in contact with an identical reference plane 8a.

More specifically, using, for example, a jig 9 shown in FIG. 2, a relative distance between the first ferrule 3 and second ferrule 6 is determined and arrangement positions are determined so that a portion of the external diameter ridgeline of the first ferrule 3 and that of the second ferrule 6 are in contact with the identical reference plane 8a. Then, the optical fiber 2 is passed through a fiber insertion hole (See numeral 6-1 shown in FIG. 3 with respect to the second ferrule 6) provided in each of the first ferrule 3 and second ferrule 6 while maintaining the determined arrangement positions. After the optical fiber 2 is passed through as far as the tip of the optical fiber 2 reaches the end face of the first ferrule 3, while maintaining this state, the first ferrule 3 and second ferrule 6 are fixed to the optical fiber 2 by an adhesive or the like.

Then, the optical fiber assembly 11 assembled as described above is inserted into the package 4 containing the optical waveguide chip 1 from the support pipe 5 airtightly fixed around the opening 4a. Then, optical axis adjustments of the optical waveguide chip 1 and the optical fiber 2 are made so that the optical fiber 2 has a radius equal to or greater than an allowable bending radius. After the optical axis adjustments are made, the optical waveguide chip 1 and the first ferrule 3 are fixed by an adhesive or the like and the second ferrule 6 is airtightly fixed to the tip of the support pipe 5 by solder or the like while maintaining the position after the optical axis adjustments.

Figure 3:
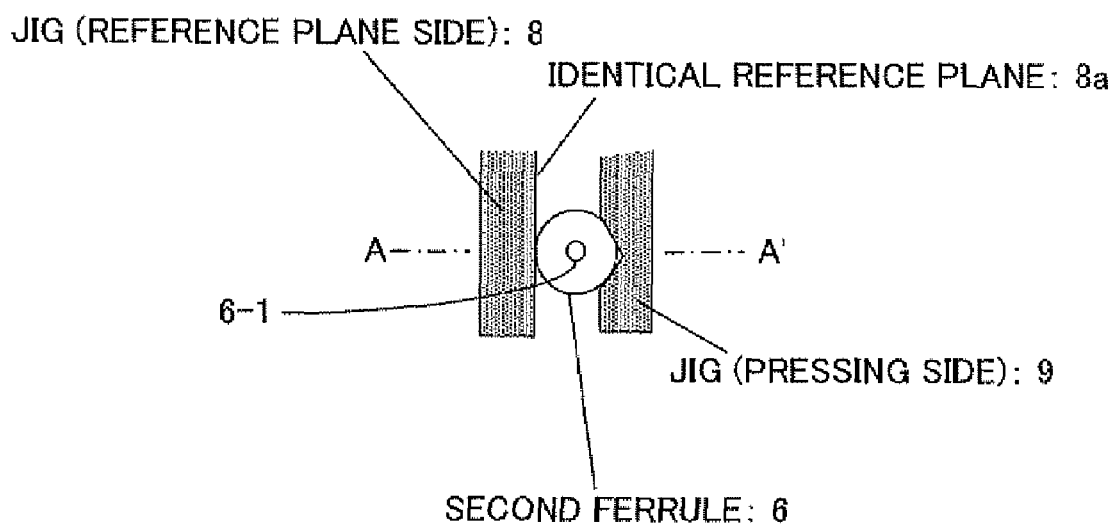

The optical waveguide chip 1 and the first ferrule 3 described above are fixed in such a way that they are brought into contact through the above-described optical axis adjustments of the optical waveguide chip 1 and the optical fiber 2 and when performing the optical axis adjustment work, for example, jigs 8 and 9 shown in FIG. 2 are used to move the first ferrule 3 and the second ferrule 6 protruding toward the inner part of the package 4 by simultaneously gripping both. FIG. 3 shows an AA' cross section shown in FIG. 2.

More specifically, as shown in FIG. 2 and FIG. 3, the first ferrule 3 and second ferrule 6 are gripped simultaneously and integrally by selecting the reference plane 8a of the jig 8 identical to external diameter ridgelines of the first ferrule 3 and second ferrule 6 in the optical fiber assembly 11 as one holding face and holding the first ferrule 3 and second ferrule 6 from an opposite side of the reference plane 8a with the other jig 9 to make optical axis adjustments of the optical waveguide chip 1 and the optical fiber 2.

That is, since the optical fiber assembly 11 is assembled so that the optical fiber 2 is not bent when the first ferrule 3 and second ferrule 6 are in contact with the identical reference plane 8a, a state in which the optical fiber 2 is not bent can be reproduced by gripping the optical fiber assembly 11 according to a method using the identical reference plane 8a.

Therefore, optical axis adjustments are made by gripping the first ferrule 3 and second ferrule 6 integrally and simultaneously using the jig 9 for gripping the first ferrule 3 and second ferrule 6 together with the jig 8 that contains the reference plane 8a as the holding face. The jig 9 for holding the first ferrule 3 and second ferrule 6 together with the jig 8 has a holding face adapted to external diameters of the first ferrule 3 and second ferrule 6. Particularly, by forming a holding portion in a V-groove shape as shown in FIG. 3, gripping can be stabilized.

Since a relative positional relationship with the optical waveguide chip 1 is adjusted by gripping the first ferrule 3 and second ferrule 6 integrally and simultaneously, optical axis adjustments can easily be made with high accuracy while maintaining a state in which the optical fiber 2 between the first ferrule 3 and second ferrule 6 is within an allowable bending radius. That is, the first ferrule 3 and second ferrule 6 can be gripped inside the package 4 in such a way that the bending radius of the optical fiber 2 satisfies a permissible value, and therefore position adjustments of the first ferrule 3 and second ferrule 6 can be made simultaneously without being constrained by the position of the support pipe 5.

In other words, since the relative position of the second ferrule 6 with respect to the first ferrule 3 is determined by a state in which both the first ferrule 3 and second ferrule 6 are directly gripped, the allowable radius of the optical fiber 2 can easily and reliably be secured (See the condition [2] described above). The allowable bending radius of the optical fiber 2 will thereby be secured reliably even if the optical fiber 2 (See numeral 113 in FIG. 14) exposed inside the package 4 is made shorter for miniaturization of the package 4. Also, optical axis adjustment work itself can be simplified, contributing to reduction of manufacturing costs as the optical waveguide device 10.

By airtightly fixing the support pipe 5 to the package 4 and making the length of the second ferrule 6 sticking out from the support pipe 5 equal to a minimum length required for airtight fixing (in this case, a length required for soldering), the second ferrule 6 holding the optical fiber 2 can substantially be protected by the support pipe 5 on the outer side, securing nose strength (strength of a portion sticking out from the package 4 to guide the optical fiber 2 from the package 4) (See the condition [4] described above).

That is, if the length of the second ferrule 6 sticking out from the support pipe 5 is limited to such a length required for substantially airtight fixing, it is substantially difficult to grip the second ferrule 6 from outside the package 4 (or the support pipe 5) and also from this point, the structure to grip the first ferrule 3 and second ferrule 6 inside the package 4 is effective as a configuration to determine the position of the second ferrule 6.

Further, by airtightly fixing the location where the optical fiber 2 and the second ferrule 6 are fixed (See C in FIG. 1) and the location where the second ferrule 6 and the support pipe 5 are fixed (See A in FIG. 1), the package 4 can hermetically be sealed (See the condition [3] described above).

Naturally, thermal expansion matching can be realized by matching a first amount of expansion or contraction caused by thermal expansion of part a of the package 4 in FIG. 1 and thermal expansion of part b of the pipe 5 and a second amount of expansion or contraction caused by thermal expansion of part c of the optical fiber 2 and thermal expansion of part d of the second ferrule 6 (See the condition [1] described above).

Figure 14:
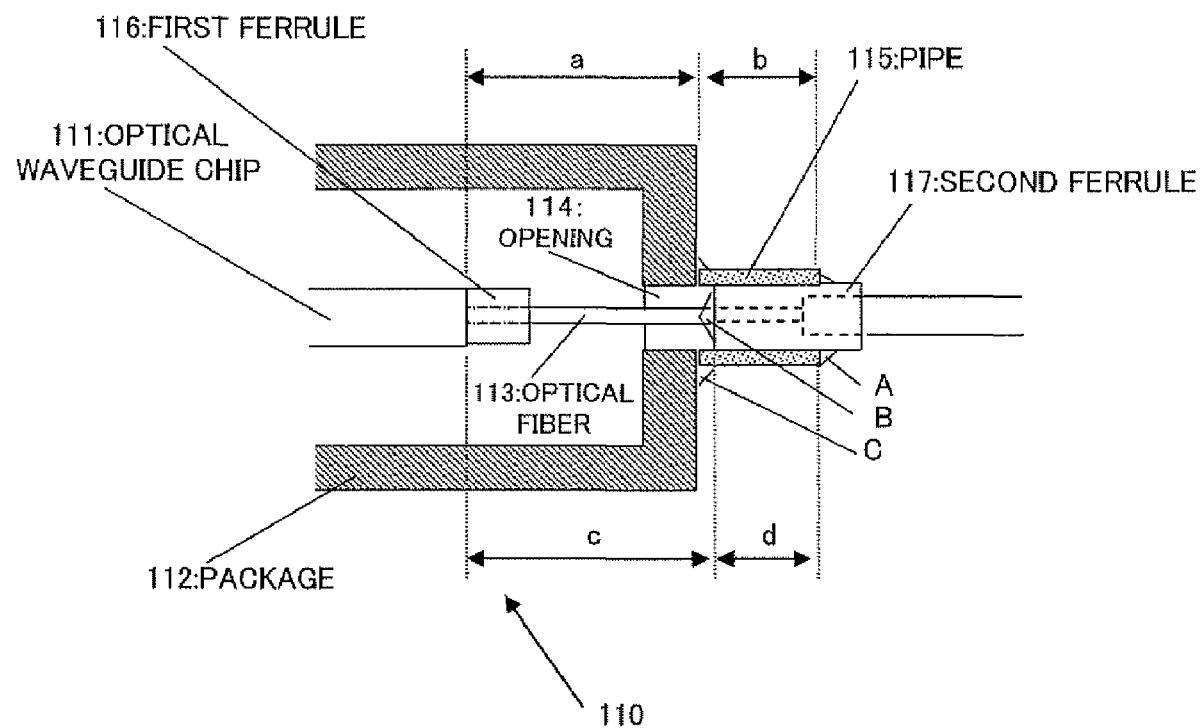

In the optical waveguide device 10 according to the first embodiment, as described above, the optical fiber 2 (See numerals 112 and 113 in FIG. 14) inside the package 4 can be made shorter when compared with the optical waveguide device 110 shown in FIG. 14, and therefore miniaturization of the device can be achieved while satisfying the above-described conditions shown in [1] to [4].

In FIG. 2 described above, the first ferrule 3 and second ferrule 6 are to be gripped on the identical reference plane 8a using the jig 8 for gripping the first ferrule 3 and second ferrule 6, but a reference plane for holding the first ferrule 3 and second ferrule 6 simultaneously and integrally with a jig may be provided on the first ferrule 3 and the second ferrule 6 without forming the identical reference plane 8a. Also in this case, like the case in FIG. 2, optical axis adjustments can be made accurately and easily while maintaining the relative positional relationship between the first ferrule 3 and second ferrule 6.

Next, thermal expansion when heat is added to the optical waveguide device 10 constructed as described above will be discussed.

It is assumed that the distance from a point (P1 point) where the optical waveguide chip 1 and the optical fiber 2 are fixed to an outer surface of the sidewall of the package 4 is "a", and that from the outer surface of the sidewall of the package 4 to a point (P2 point) where the second ferrule 6 and the support pipe 5 are fixed is "b". Also it is assumed that the distance from the point P1 to a point (point P3) where the optical fiber 2 and the second ferrule 6 are fixed is "c", and that from the point P3 to the point P2 is d. Then, it is assumed that the thermal expansion coefficient of the package is $\alpha 1$, that of the first pipe is $\alpha 2$, that of the optical fiber (glass) is $\alpha 3$, that of the second ferrule is $\alpha 4$, and an ambient temperature change is $\Delta T$.

If here a certain material A is heated, an amount of expansion or contraction of the material A can be expressed as $\alpha \times L \times \Delta T$, where L is the length of the material A, $\alpha$ is the thermal expansion coefficient of the material A, and $\Delta T$ is the temperature change.

Therefore, a first amount of expansion or contraction $\Delta L1$ caused by thermal expansion of the package 4 and that of the support pipe 5 is determined by Formula (1):

$$\Delta L1 = \alpha 1 \times a \times \Delta T + \alpha 2 \times b \times \Delta T \quad (1)$$

That is, the amount of expansion or contraction $\Delta L1$ of the package 4 and the support pipe 5 is a sum of the amount of expansion or contraction ($\alpha 1 \times a \times \Delta T$) determined by the package 4 and that ($\alpha 2 \times b \times \Delta T$) determined by the support pipe 5.

A second amount of expansion or contraction $\Delta L2$ caused by thermal expansion of the optical fiber 2 and that of the second ferrule 6 is determined by Formula (2):

$$\Delta L2 = \alpha 3 \times c \times \Delta T + \alpha 4 \times d \times \Delta T \quad (2)$$

That is, the amount of expansion or contraction $\Delta L2$ of the optical fiber 2 and the second ferrule 6 is a sum of the amount of expansion or contraction ($\alpha 3 \times c \times \Delta T$) determined by the optical fiber 2 and that ($\alpha 4 \times d \times \Delta T$) determined by the second ferrule 6.

Thus, if $\Delta L1$ determined by Formula (1) and $\Delta L2$ determined by Formula (2) become equal, no excessive stress will be applied to a connection fixed part between the optical waveguide and optical fiber.

Therefore, material and dimensions of each component can be selected to satisfy the above-described thermal expansion design.

By selecting the second ferrule 6 as a cylinder with, for example, the external diameter of 2.5 mm and the support pipe 5 with the internal diameter of 3.3 mm so that the internal diameter of the support pipe 5 is a little larger than the external diameter of the second ferrule 6, the position of the second ferrule 6 will not be constrained by that of the support pipe 5 and thus the second ferrule 6 can be positioned by moving the second ferrule 6 inside the support pipe 5 so that the allowable bending radius of the optical fiber 2 is secured.

Since the optical fiber assembly 11 is assembled so that the optical fiber 2 will not be bent while maintaining the first ferrule 3 and second ferrule 6 in contact with the identical reference plane 8a, a state in which the optical fiber 2 is not bent can be reproduced by using the jigs 8 and 9 to grip the optical fiber assembly 11 according to the method using the identical reference plane 8a. That is, only by directly gripping both the first ferrule 3 and the second ferrule 6 in the package 4 without making any relative position adjustments, the optical fiber 2 can unconditionally be put into a state in which the allowable bending radius is secured.

Thus, optical axis adjustments of the optical fiber 2 are made for the optical waveguide formed on the optical waveguide chip while both the first ferrule 3 and second ferrule 6 are directly gripped inside the package 4. At this point, the second ferrule 6 is arranged inside the support pipe 5 and the internal diameter of the support pipe 5 is set a little larger than the external diameter of the second ferrule 6, and therefore the optical axis adjustments of the optical fiber 2 can be made without collision of the second ferrule 6 into the support pipe 5.

Then, after the optical axis adjustments are made, the optical fiber 2 and the optical waveguide constituting the optical waveguide chip 1 are fixed via the first ferrule 3 by, for example, a UV adhesive. Subsequently, the tip of the support pipe 5 and the second ferrule 6 are airtightly fixed while the first ferrule 3 and second ferrule 6 are gripped. By fixing the second ferrule 6 while maintaining the position after the optical axis adjustments, assembly work can be completed without causing the optical fiber 2 to bend.

According to the first embodiment of the present invention, as described above, the second ferrule 6 is fixed inside the support pipe 5, one end thereof is constructed to protrude toward the inner part of the package 4, and another end is constructed to substantially protrude at the tip part of the support pipe 5 by a length required for airtight fixing, and therefore when optical axis adjustments are made by connecting the optical fiber assembly 11 in which the first ferrule 3 is fixed to the optical fiber 2 together with the second ferrule 6 to the optical waveguide chip 1, the first ferrule 3 and the second ferrule 6 can be gripped directly and simultaneously inside the package 4. Consequently, the allowable bending radius of the optical fiber 2 can reliably be secured even if the optical fiber 2 is made shorter to reduce the size of optical waveguide device 10, and thus optical axis adjustment work itself can be simplified while achieving reduced device size and integration of the optical waveguide device 10, contributing to reduction in manufacturing costs of the optical waveguide device 10 as well.

[A1] Concrete Configuration Aspect

Next, a concrete configuration aspect of the optical waveguide device 10 according to the first embodiment will be described. The optical waveguide chip 1 is a light modulation element made of an LN substrate (thermal expansion coefficient: $16.7\times10^{-6}/°$ C.) and SUS304 (thermal expansion coefficient: $17.3\times10^{-6}/°$ C.), for example, is selected for the package 4 as a material whose thermal expansion coefficient is approximately equal to that of the LN light modulation element. The support pipe 5 is airtightly fixed to the opening 4a on the sidewall of the package 4 by, for example, silver-alloy brazing. The entire back surface of the optical waveguide chip 1, which acts as an LN light modulation element, excluding areas near incoming/outgoing end faces is fixed to the package 4 by an epoxy adhesive or the like.

The optical fiber 2 is connected and fixed to the optical waveguide chip 1 via the first ferrule 3 made of a glass member. The other end of the optical fiber 2 passes through the opening 4a of the sidewall of the package 4 and the support pipe 5 before being taken out to the outside. Airtight fixing is provided to the second ferrule 6 at least on the tip part leading to the inner part of the package 4 after inserting the optical fiber 2 through the second ferrule 6. Also, airtight fixing by solder is provided to the second ferrule 6 on the tip part of the support pipe 5.

By providing airtight fixing to the fixed part of the optical fiber 2 and the second ferrule 6, that of the package 4 and the support pipe 5, and that of the support pipe 5 and the second ferrule 6, hermetic sealing is secured for locations through which the optical fiber 2 is introduced into the package 4.

Next, an assembly method of the optical waveguide device 10 configured as described above will be described.

First, a description of assembly of the optical waveguide device 11 is provided. A cylinder with the external diameter of 2.5 mm, which is equal to that of the second ferrule 6, can be selected for the first ferrule 3. The first ferrule 3 and second ferrule 6 are arranged, as shown in FIG. 2, so that a portion of the external diameter ridgeline of each is in contact with the identical reference plane (flat surface) 8a and the opposite side is pressed by, for example, the jig 9 in the V-groove shape. In this state, the optical fiber 2 is inserted through the first ferrule 3 and second ferrule 6. At this point, the relative position and hole size of the optical fiber insertion hole provided in the first ferrule 3 and second ferrule 6 are set so that no bending (deflection) of the optical fiber 2 is caused by deviation of positions. It is assumed, for example, that the insertion hole of the first ferrule 3 has center position accuracy of ±0.01 mm with respect to the external diameter and the hole size of 127+3/−0 µm, and the insertion hole of the second ferrule 6 has the center position accuracy of ±0.05 mm with respect to the external diameter and the hole size of 0.3 mm. If, at this point, the first ferrule 3 and the second ferrule 6 are in contact with the identical reference plane 8a, the maximum deviation of relative position of the optical fiber insertion holes will be 0.06 mm, but since the insertion hole size of the second ferrule 6 is set sufficiently larger (there is a gap of 0.175 mm) than the external diameter ($\phi$: 125 µm) of the optical fiber 2, the optical fiber 2 will not be bent (deflected) by deviation of relative position of the insertion holes. That is, the optical fiber 2 is inserted into the first ferrule 3 and second ferrule 6 without bending. In this state, the first ferrule 3 and the optical fiber 2 are fixed by, for example, an epoxy adhesive, and the optical fiber 2 and the second ferrule 6 are airtightly fixed by solder. Subsequently, the jig 9 is removed to complete the optical fiber assembly 11.

Next, the optical fiber assembly 11 is inserted into the package 4 from the support pipe 5. Then, the first ferrule 3 and second ferrule 6 are directly gripped inside the package 4 according to the identical positioning method (See FIG. 2) using the above-described reference plane 8a.

Here, the length of the second ferrule 6 is considered when designing the above-described thermal expansion matching so that the first ferrule 3 and second ferrule 6 can be gripped inside the package 4. For example, the length of the package 4 is set to 9.5 mm, the thickness of the package sidewall to 1 mm, and the length of the optical fiber 2 (including the first ferrule) to 5 mm, and therefore the length of the second ferrule 6 positioned inside the package 4 is 3.5 mm, securing a sufficient length for gripping.

Since the optical fiber assembly 11 is assembled so that the optical fiber 2 will not be bent when the first ferrule 3 and second ferrule 6 are in contact with the identical reference plane 8a, as described above, a state in which the optical fiber 2 is not bent can be reproduced by gripping the optical fiber assembly 11 according to the method using the identical reference plane 8a. That is, only by directly gripping both the first ferrule and the second ferrule inside the package without making any relative position adjustments, the optical fiber can unconditionally be put into a state in which the allowable bending radius is secured.

Thus, optical axis adjustments of the optical fiber 2 are made for the optical waveguide while both the first ferrule 3 and second ferrule 6 are directly gripped inside the package 4. At this point, the second ferrule 6 is arranged inside the support pipe 5 and the internal diameter of the support pipe 5 is set a little larger than the external diameter of the second ferrule 6, and therefore the optical axis adjustments of the optical fiber 2 can be made without collision of the second ferrule 6 into the support pipe 5. After the optical axis adjustments are made, the optical fiber 2 and the optical waveguide are fixed via the first ferrule 3 by, for example, a UV adhesive. Subsequently, the tip of the support pipe 5 and the second ferrule 6 are airtightly fixed while the first ferrule 3 and second ferrule 6 are gripped. By fixing the second ferrule 6 while maintaining the position after the optical axis adjustments, assembly work can be completed without causing the optical fiber 2 to bend.

[B] Description of the Second Embodiment

Figure 4:
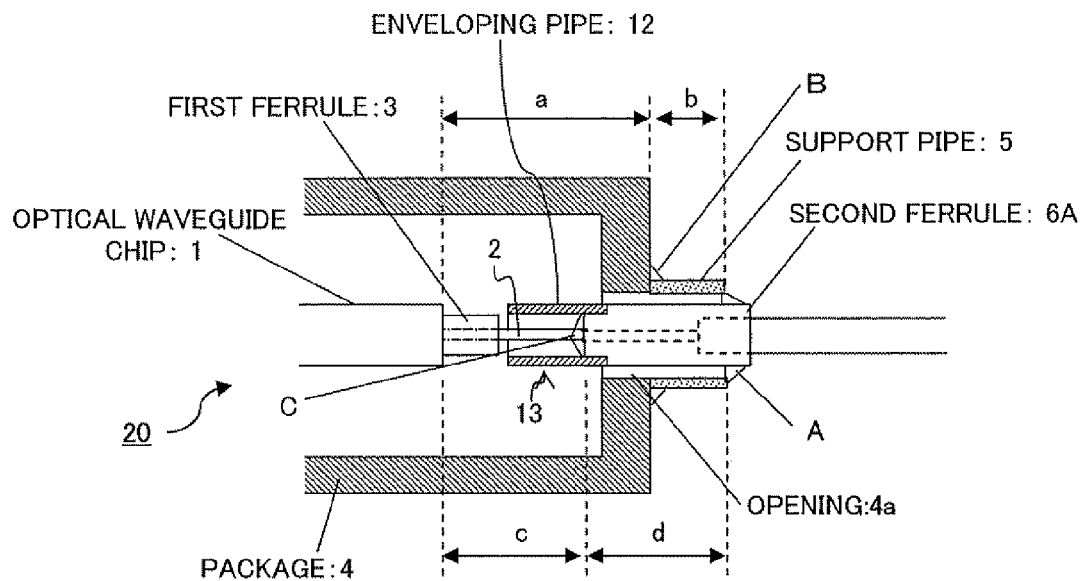
FIG. 4 is a schematic top view showing an optical waveguide device according to a second embodiment of the present invention.

FIG. 4 is a schematic top view showing an optical waveguide device 20 according to the second embodiment of the present invention and shows the optical waveguide device 20 by focusing particularly on conduction connection of the optical waveguide chip 1 constituting the optical waveguide device 20 and the optical fiber 2 leading to the outside of the package 4. In contrast to the optical waveguide device 10 in the first embodiment described above, the optical waveguide device 20 shown in FIG. 4 has an enveloping pipe (second pipe) 12 mounted on the tip part of the second ferrule 6A on an inner side of the package 4. While the enveloping pipe 12 is mounted on a second ferrule 6A, other configuration is basically the same as that of the above-described first embodiment. The same numerals in FIG. 4 as those in FIG. 1 denote approximately the same components.

Here, the second ferrule 6A has the external diameter smaller than the internal diameter of the support pipe (first pipe) 5, is airtightly fixed to the tip of the support pipe 5 after being inserted into the support pipe 5, and through which the optical fiber 2 passing through the opening 4a to come out of the package 4 is inserted for airtight fixing. The enveloping pipe 12 is mounted on the tip part of the second ferrule 6A leading to the inner part of the package 4 and the length thereof is set so that the enveloping pipe 12 protrudes from an inner wall constituting the package 4.

The enveloping pipe 12 can have a hollow structure having the external diameter approximately equal to that of the second ferrule 6A and a predetermined reference plane 8b (See FIG. 5) in contact with external diameter ridgelines of the first ferrule 3 and the enveloping pipe 12 can be set in a portion positioned inside the package 4 to determine the relative position of the first ferrule 3 and the enveloping pipe 12.

That is, by bringing a jig 8A shown in FIG. 5 and FIG. 6 described below having the reference plane 8b as a holding face into contact with the first ferrule 3 and the enveloping pipe 12 and holding the opposite side with the jig 9 for gripping, optical axis adjustments can be made while the distance between the first ferrule 3 and the second ferrule 6A is maintained constant. Like the first embodiment described above (See numeral 8a), the reference plane may be selected as an identical reference plane for the first ferrule 3 and the enveloping pipe 12 (and the second ferrule 6A) (that is, a portion of the external diameter ridgeline of each component is in contact with an identical reference plane).

An optical fiber assembly 13 is constructed from the optical fiber 2 adapted to optically connect to the optical waveguide described above, the first ferrule 3 mounted at the tip of the optical fiber 2 to connect and fix the optical waveguide and the optical fiber 2, the second ferrule 6A mounted on the optical fiber 2 on the inner side from the first ferrule 3, and the enveloping pipe 12 mounted on the second ferrule 6A on the first ferrule 3 side to envelop the optical fiber 2.

The optical waveguide device 20 according to the second embodiment is assembled as shown below.

Figure 5:
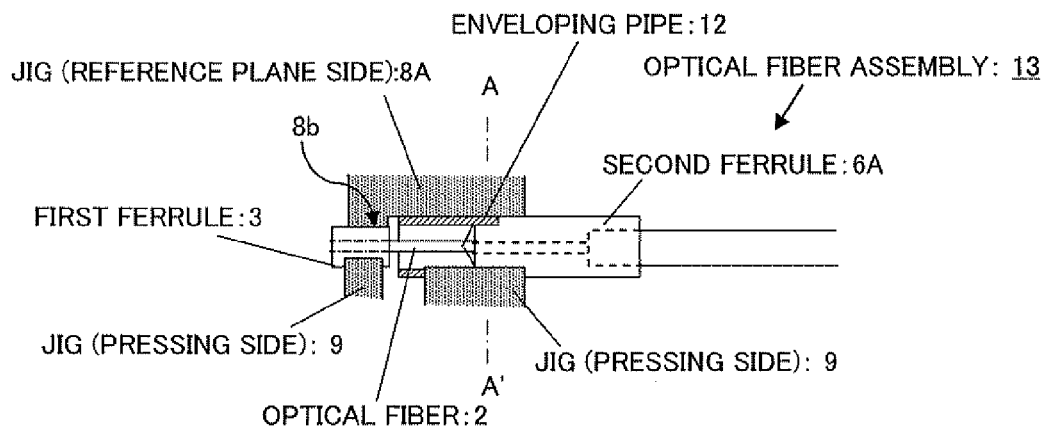
FIG. 5 and FIG. 6 are both diagrams for describing manufacturing processes of the optical waveguide device according to the second embodiment of the present invention.

First, the first ferrule 3, the optical fiber 2, and the second ferrule 6A on which the enveloping pipe 12 is mounted are fixed to assemble the optical fiber assembly 13 (See FIG. 5). Like the first embodiment described above, the package 4 has the optical waveguide chip 1 mounted.

At this point, the first ferrule 3 is positioned at the tip of the optical fiber 2 and the second ferrule 6A on which the enveloping pipe 12 is mounted is inserted through the optical fiber 2 on the inner side from the first ferrule 3. The second ferrule 6A is fixed with a distance from the tip position of the optical fiber 2 so as to match a relationship between the mounting position of the optical waveguide chip 1 described above and the tip position of the support pipe 5 on the outer side of the package 4. Further, the first ferrule 3 and the enveloping pipe 12 are constructed so that a portion of the external diameter ridgeline of the first ferrule 3 and that of the enveloping pipe 12 inside the package 4 are in contact with the identical reference plane 8a.

More specifically, using, for example, a jig 8A and the jig 9 shown in FIG. 5, the relative distance between the first ferrule 3 and second ferrule 6A on which the enveloping pipe 12 is mounted is determined and arrangement positions are determined so that the holding face of the jig 8A is in contact with the reference plane 8b constituting a portion of the external diameter ridgeline of the first ferrule 3 and that of the enveloping pipe 12. Then, the optical fiber 2 is passed through the fiber insertion hole (See numeral 6-1 shown in FIG. 6 with respect to the second ferrule 6A) provided in each of the first ferrule 3 and second ferrule 6A while maintaining the determined arrangement positions. After the optical fiber 2 is passed through as far as the tip of the optical fiber 2 reaches the end face of the first ferrule 3, while maintaining this state, the first ferrule 3 and the optical fiber 2 are fixed by an adhesive or the like and second ferrule 6A and the optical fiber 2 are fixed by solder or the like.

Then, the optical fiber assembly 13 assembled as described above is inserted into the package 4 containing the optical waveguide chip 1 from the support pipe 5 airtightly fixed around the opening 4a. Then, optical axis adjustments of the optical waveguide chip 1 and the optical fiber 2 are made so that the optical fiber 2 has a radius equal to or greater than the allowable bending radius. After the optical axis adjustments are made, the optical waveguide chip 1 and the first ferrule 3 are fixed by an adhesive or the like and the second ferrule 6A is airtightly fixed to the tip of the support pipe 5 by solder or the like while maintaining the position after the optical axis adjustments.

The optical waveguide chip 1 and the first ferrule 3 described above are fixed in such a way that they are brought into contact through the above-described optical axis adjustments of the optical waveguide chip 1 and the optical fiber 2 and when performing the optical axis adjustment work, for example, the jigs 8A and 9 shown in FIG. 5 are used to move the first ferrule 3 and the enveloping pipe 12 protruding toward the inner part of the package 4 by simultaneously gripping both. FIG. 6 shows an AA' cross section shown in FIG. 5.

Figure 6:
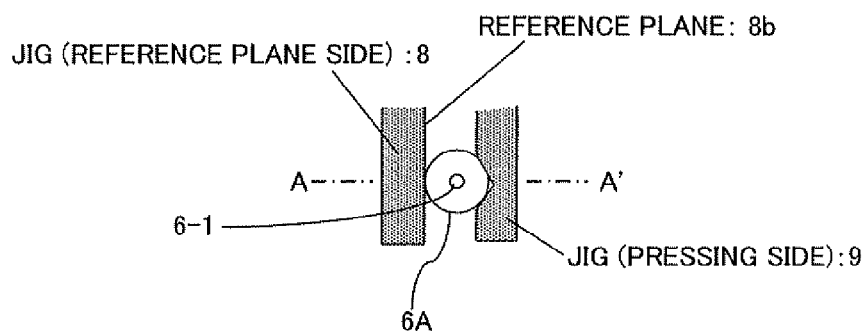

More specifically, as shown in FIG. 5 and FIG. 6, the first ferrule 3 and the enveloping pipe 12 (and the second ferrule 6A) are gripped simultaneously and integrally by selecting the reference plane 8b of the jig 8A identical to external diameter ridgelines of the first ferrule 3 and the enveloping pipe 12 in the optical fiber assembly 13 as one holding face and holding the first ferrule 3 and the enveloping pipe 12 from the opposite side of the reference plane 8b with the other jig 9 to make optical axis adjustments of the optical waveguide chip 1 and the optical fiber 2.

That is, since the optical fiber assembly 13 is assembled so that the optical fiber 2 is not bent when the first ferrule 3 and the enveloping pipe 12 are in contact with the identical reference plane 8b, a state in which the optical fiber 2 is not bent can be reproduced by gripping the optical fiber assembly 13 according to the method using the identical reference plane 8b.

Thus, after the optical axis adjustments are made, like the first embodiment described above, the optical fiber 2 and the optical waveguide constituting the optical waveguide chip 1 are fixed via the first ferrule 3 by, for example, a UV adhesive. Subsequently, the tip of the support pipe 5 and the second ferrule 6A are airtightly fixed while the first ferrule 3 and the enveloping pipe 12 (and the second ferrule 6A) are gripped. By fixing the second ferrule 6A while maintaining the position after the optical axis adjustments, assembly work can be completed without causing the optical fiber 2 to bend.

According to the second embodiment of the present invention, as described above, the second ferrule 6A is fixed inside the support pipe 5, one end thereof is constructed to substantially protrude at the tip part of the support pipe 5 by a length required for airtight fixing, and the enveloping pipe 12 is constructed to protrude toward the inner part of the package 4, and therefore when optical axis adjustments are made by connecting the optical fiber assembly 13 in which the first ferrule 3 is fixed to the optical fiber 2 together with the second ferrule 6A on which the enveloping pipe 12 is mounted to the optical waveguide chip 1, the first ferrule 3 and the enveloping pipe 12 can be gripped directly and simultaneously inside the package 4. Consequently, the allowable bending radius of the optical fiber 2 can reliably be secured even if the distance between the connection surface of the optical waveguide chip 1 and first ferrule 3 and the position of the opening 4a of the package 4 is made shorter to reduce the size of the optical waveguide device 20, and thus optical axis adjustment work itself can be simplified while achieving reduced device size and integration of the optical waveguide device 20, contributing to reduction in manufacturing costs of the optical waveguide device 20 as well.

If the distance between the connection surface of the optical waveguide chip 1 and first ferrule 3 and the position of the opening 4a of the package 4 is made shorter to a level of the first embodiment to reduce the size of the optical waveguide device 20, the length of the optical fiber 2 exposed between the first ferrule 3 and second ferrule 6A can be made longer than in the first embodiment, and therefore bending tolerance can be made larger than in the first embodiment.

Further, even if the second ferrule 6A cannot be designed to be as long as in the first embodiment due to design constraints to match thermal expansion, the allowable bending radius of the optical fiber can be secured by adopting a structure in which the enveloping pipe 12 is mounted.

[B1] Concrete Configuration Aspect

Next, a concrete configuration aspect of the optical waveguide device 20 according to the second embodiment will be described. Material and dimensions of each component in the optical waveguide device 20 can be selected as shown below to satisfy the thermal expansion design.

The material SUS304 is used for the package 4 and Invar, whose thermal expansion is small, for the support pipe 5. Aluminum, whose thermal expansion is larger than that of the package 4, is used as a material of the second ferrule 6A.

Then, it is assumed that the length of the package 4 is 6.5 mm, that of the support pipe 5 (Invar) is 3.3 mm, that of the optical fiber 2 (including a portion inserted through the first ferrule 3) is 5 mm, and that of the second ferrule 6A is 4.8 mm.

The thermal expansion coefficient of each material is as follows: The thermal expansion coefficient of SUS304 constituting the package 4 is $\alpha_1 = 17.3 \times 10^{-6}$ (/K), that of Invar constituting the support pipe 5 is $\alpha_2 = 1.2 \times 10^{-6}$ (/K), that of the glass constituting the optical fiber 2 and the first ferrule 3 is $\alpha_3 = 0.5 \times 10^{-6}$ (/K), and that of the aluminum constituting the second ferrule 6A is $\alpha_4 = 23.6 \times 10^{-6}$ (/K). If the range of temperature is −40 to 85° C. and the reference temperature is 25° C., which is the temperature during device production, the maximum temperature difference $\Delta T$ will be 65° C. (25° C.→−40° C.).

Calculation of the amount of expansion or contraction $\Delta L1$ on the package 4 side according to Formula (1) under these set conditions yields $\Delta L1 = (17.3 \times 10^{-6} \times 6.5 + 1.2 \times 10^{-6} \times 3.3) \times 65 = 7.6$ μm and calculation of the amount of expansion or contraction $\Delta L2$ on the optical fiber 2 side according to Formula (2) yields $\Delta L2 = (0.5 \times 10^{-6} \times 5 + 23.6 \times 10^{-6} \times 4.8) \times 65 = 7.5$ μm.

Thus, by achieving thermal expansion matching by matching the first amount of expansion or contraction $\Delta L1$ caused by thermal expansion on the package 4 side and the second expansion or contraction $\Delta L2$ caused by thermal expansion on the optical fiber 2 side, no tensile stress or compressive stress caused by thermal expansion or contraction will be applied to the connection fixed part of the optical waveguide and the optical fiber 2.

Also, like the first embodiment, the second ferrule 6A was selected as a cylinder with the external diameter of 2.5 mm and the support pipe 5 with the internal diameter of 3.3 mm. The second ferrule 6A is positioned and fixed inside the support pipe 5 so that the allowable bending radius of the optical fiber 2 is secured.

The method of positioning (adjustments of the bending radius of the optical fiber 2)/fixing the second ferrule 6A will be described in the assembly method described next.

First, a description of assembly of the optical fiber assembly 13 is provided. For the first ferrule 3, a cylinder with the external diameter of 1 mm, which is smaller than that of the second ferrule 6A, was selected. For the enveloping pipe 12, the external diameter was set to 2.5 mm, which is the same as that of the second ferrule 6A, and the internal diameter was set to 1.8 mm, which is larger than the external diameter of the first ferrule 3. A step is provided to the tip part of the second ferrule 6A so that the enveloping pipe 12 can be press-fitted.

The first ferrule 3, second ferrule 6A, and enveloping pipe 12 are pressed by the jig 8A and the jig 9 in the V-groove shape as shown in FIG. 5 and FIG. 6 after the enveloping pipe 12 is press-fitted into the second ferrule 6A.

In this state, the optical fiber 2 is inserted through the first ferrule 3 and second ferrule 6A. At this point, the relative position of the first ferrule 3 and second ferrule 6A supported by the jigs 8A and 9 is determined and the hole size of each of optical fiber insertion holes provided in the first ferrule 3 and second ferrule 6A is set so that no bending (deflection) of the optical fiber 2 is caused by deviation of positions.

In this state, for example, the first ferrule 3 and the optical fiber 2 are fixed by an epoxy adhesive and the optical fiber 2 and the second ferrule 6A are airtightly fixed by solder. At this point, the enveloping pipe 12 can have a split form to facilitate an adhesion/fixing process and holes may be provided in a portion of the side of the enveloping pipe 12. Subsequently, the jigs 8A and 9 are removed to complete the optical fiber assembly 13.

Next, the optical fiber assembly 13 is inserted into the package 4 from the support pipe 5. Then, the first ferrule 3 and the enveloping pipe 12 are directly gripped inside the package 4 according to the identical positioning technique (See FIG. 5 and FIG. 6) using the above-described reference plane.

Here, the length of the enveloping pipe 12 is set in consideration of the above-described thermal expansion matching design so that the first ferrule 3 and the enveloping pipe 12 can be gripped inside the package 4. For example, the length of the package 4 is set to 6.5 mm, the thickness of the package 4 sidewall to 1 mm, and the length of the optical fiber 2 (including the first ferrule 3) to 5 mm, and therefore the length of the second ferrule 6A positioned inside the package 4 becomes only 0.5 mm, which is not sufficient for gripping. Thus, in the second embodiment, the enveloping pipe 12 is mounted at the tip of the second ferrule 6A. The length of the enveloping pipe 12 positioned inside the package 4 is set to 3 mm so that the enveloping pipe 12 can be gripped inside the package 4.

Since the optical fiber assembly 13 is assembled so that the optical fiber 2 will not be bent when the first ferrule 3, second ferrule 6, and enveloping pipe 12 are in contact with the reference plane, as described above, a state in which the optical fiber 2 is not bent can be reproduced by gripping the optical fiber assembly 13 to connect to the optical waveguide chip 1 to make optical axis adjustments according to the method using the identical reference plane used when constructing the optical fiber assembly 13. That is, only by directly gripping both the first ferrule 3 and the enveloping pipe 12 (indirectly the second ferrule 6A) inside the package 4 without making any relative position adjustments of the first ferrule 3 and second ferrule 6A, the optical fiber 2 can unconditionally be put into a state in which the allowable bending radius is secured.

Thus, optical axis adjustments of the optical fiber 2 are made for the optical waveguide while the first ferrule 3 and the enveloping pipe 12 (indirectly the second ferrule 6A) are directly gripped inside the package 4. At this point, the second ferrule 6A is arranged inside the support pipe 5 and the internal diameter of the support pipe 5 is set a little larger than the external diameter of the second ferrule 6A, and therefore the optical axis adjustments of the optical fiber 2 can be made without collision of the second ferrule 6A into the support pipe 5. After the optical axis adjustments are made, the optical fiber 2 and the optical waveguide are fixed via the first ferrule 3 by, for example, a UV adhesive. Subsequently, the tip of the support pipe 5 and the second ferrule 6A are airtightly fixed while the first ferrule 3 and second ferrule 6A are gripped. By fixing the second ferrule 6A while maintaining the position after the optical axis adjustments, assembly work can be completed without causing the optical fiber 2 to bend.

[C] Description of the Third Embodiment

Figure 7:
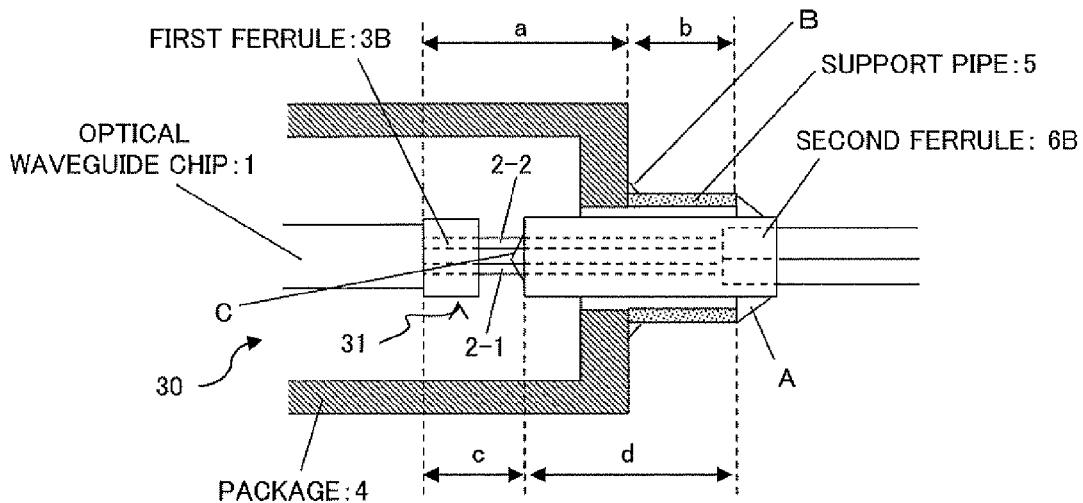
FIG. 7 is a schematic top view showing an optical waveguide device according to a third embodiment of the present invention.

FIG. 7 is a schematic top view showing an optical waveguide device 30 according to the third embodiment of the present invention. The optical waveguide device 30 shown in FIG. 7 is different from the optical waveguide device 10 in the first embodiment described above in that 2-core optical fibers 2-1 and 2-2 are used for conduction. Accordingly, two fiber insertion holes are provided in first and second ferrules 3B and 6B respectively (See numerals 6-1 and 6-2 shown in FIG. 9 with respect to the second ferrule 6B). The same numerals in FIG. 7 as those in FIG. 1 denote approximately the same components.

Figure 8:
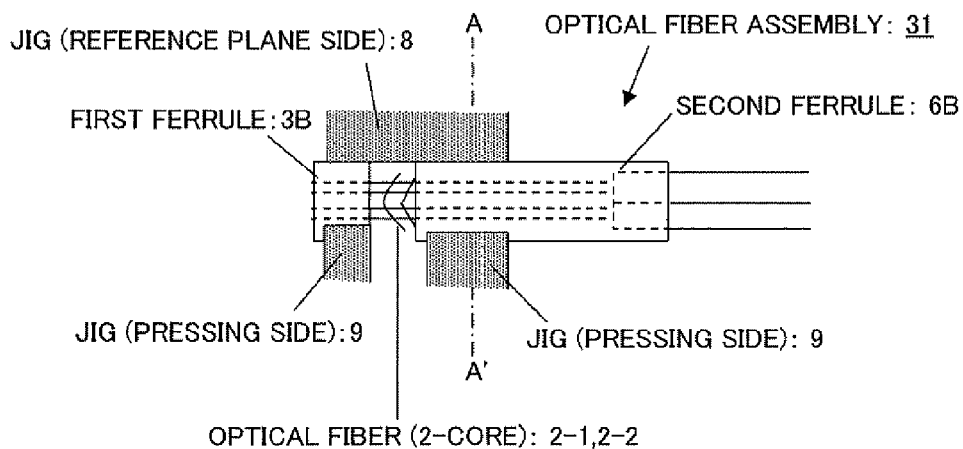
FIG. 8 and FIG. 9 are both diagrams for describing manufacturing processes of the optical waveguide device according to the third embodiment of the present invention.
Figure 9:
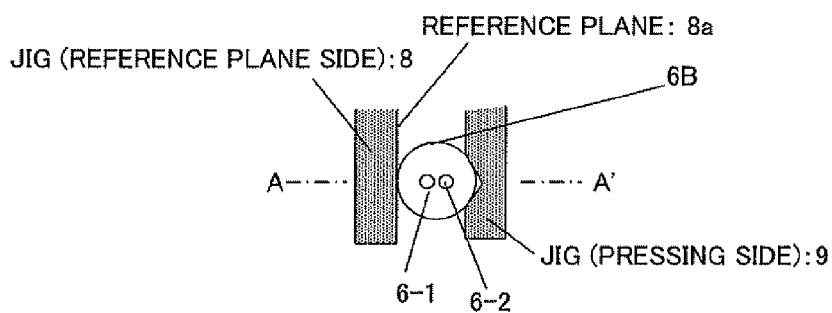

When assembling the optical waveguide device 30 in the third embodiment, like the first embodiment (See numeral 11), an optical fiber assembly 31 shown in FIG. 8 is constructed from the first ferrule 3B, second ferrule 6B, and optical fibers 2-1 and 2-2. FIG. 9 shows an AA' cross section shown in FIG. 8. As shown in FIG. 8 and FIG. 9, the reference plane 8a for constructing the optical fiber assembly 31 is selected to be approximately perpendicular to the alignment plane of the optical fibers 2-1 and 2-2. That is, the plane in which the first ferrule 3B and second ferrule 6B are gripped by the jigs 8 and 9 is selected to be perpendicular to the optical fiber alignment plane.

When an optical fiber array having a plurality of optical fibers like the third embodiment is applied, the highest level of accuracy is required for relative deviation of the first ferrule 3B and second ferrule 6B in an optical fiber alignment plane. Thus, the relative deviation can be controlled effectively, and therefore the allowable bending radius of the optical fiber can reliably be secured also for a multi-core structure.

Thus, also in the optical waveguide device 30 according to the third embodiment, in addition to advantages like those of the first embodiment described above, an advantage of being able to reliably secure the allowable bending radius of the optical fiber can be obtained from the multi-core structure.

[C1] Concrete Configuration Aspect

Next, a concrete configuration aspect of the optical waveguide device 30 according to the third embodiment will be described. Selection of material and dimensions of each component based on the thermal expansion design was made in the same manner as the first embodiment. By achieving thermal expansion matching by matching the first amount of expansion or contraction ΔL1 caused by thermal expansion on the package side and the second expansion or contraction ΔL2 caused by thermal expansion on the optical fiber side, no tensile stress or compressive stress caused by thermal expansion or contraction will be applied to the connection fixed part of the optical waveguide and the optical fiber 2.

The second ferrule 6B was selected as a cylinder with the external diameter of 3.5 mm and the support pipe 5 with the internal diameter of 4.3 mm. The second ferrule 6B is positioned and fixed inside the support pipe 5 so that the allowable bending radius of the optical fibers 2-1 and 2-2 is secured. The method of positioning (adjustments of the bending radius of the optical fibers 2-1 and 2-2)/fixing the second ferrule 6B will be described in detail in the assembly method described next.

First, a description of assembly of the optical fiber assembly 31 is provided. The first ferrule 3B is constructed of a V-groove substrate with 500-μm pitch and 3.5 mm was selected as a width thereof, which is equal to the external diameter of the second ferrule 6B. The first ferrule 3B and second ferrule 6B are arranged as shown in FIG. 8 so that a portion of the ridgeline of each is in contact with an identical reference plane (flat surface), and the opposite side is pressed by, for example, a V-groove shaped jig. In this state, the optical fibers 2-1 and 2-2 (two cores) are inserted through the first ferrule 3B and second ferrule 6B. At this point, the relative position and hole size of the optical fiber 2-1, 2-2 insertion holes provided in the first ferrule 3B and second ferrule 6B are set so that neither "bending (deflection) by position deviation" nor "bending (deflection) by buckling" is caused in the optical fibers 2-1 and 2-2. It is assumed, for example, that the V-groove of the first ferrule 3B has center position accuracy of ±0.01 mm with respect to the reference plane (side), and the insertion hole of the second ferrule 6B has the center position accuracy of ±0.05 mm with respect to the external diameter and the hole size of 0.5 mm. If, at this point, the first ferrule 3B and the second ferrule 6B are in contact with the identical reference plane, the maximum deviation of relative position of the optical fiber 2-1, 2-2 insertion holes will be 0.15 mm, but since the insertion hole size of the second ferrule 6B is set sufficiently larger (there is a gap of 0.375 mm) than the external diameter (φ: 125 μm) of the optical fibers 2-1 and 2-2, the optical fibers 2-1 and 2-2 will not be bent (deflected) by deviation of relative position of the insertion holes. That is, the optical fibers 2-1 and 2-2 are inserted into the first ferrule 3B and second ferrule 6B without bending. In this state, the first ferrule 3B and the optical fibers 2-1 and 2-2 are fixed by, for example, an epoxy adhesive, and the optical fibers 2-1 and 2-2 and the second ferrule 6B are airtightly fixed by solder. Subsequently, the jig is removed to complete the optical fiber assembly 31.

Next, the optical fiber assembly 31 is inserted into the package 4 from the support pipe 5. Then, the first ferrule 3B and second ferrule 6B are directly gripped inside the package 4 according to the identical positioning method (See FIG. 8) using the above-described reference plane.

Here, the length of the second ferrule 6B positioned inside the package 4 is 3.5 mm, which is equal to that in the first embodiment, and thus a sufficient length is secured for gripping.

Since the optical fiber assembly 31 is assembled so that the optical fibers 2-1 and 2-2 will not be bent when the first ferrule 3B and second ferrule 6B are in contact with an identical reference plane, as described above, a state in which the optical fibers 2-1 and 2-2 are not bent can be reproduced by gripping the optical fiber assembly according to the method using the identical reference plane. That is, only by directly gripping both the first ferrule 3B and the second ferrule 6B inside the package 4 without making any relative position adjustments of the first ferrule 3B and the second ferrule 6B, the optical fibers 2-1 and 2-2 can unconditionally be put into a state in which the allowable bending radius is secured.

Thus, optical axis adjustments of the optical fibers 2-1 and 2-2 are made for the optical waveguide while the first ferrule 3B and second ferrule 6B are directly gripped inside the package 4. At this point, the second ferrule 6B is arranged inside the support pipe 5 and the internal diameter of the support pipe 5 is set a little larger than the external diameter of the second ferrule 6B, and therefore the optical axis adjustments of the optical fibers 2-1 and 2-2 can be made without collision of the second ferrule 6B into the support pipe 5. After the optical axis adjustments are made, the optical fibers 2-1 and 2-2 and the optical waveguide are fixed via the first ferrule 3B by, for example, a UV adhesive. Subsequently, the tip of the support pipe 5 and the second ferrule 6B are airtightly fixed while the first ferrule 3B and second ferrule 6B are gripped. By fixing the second ferrule 6B while maintaining the position after the optical axis adjustments, assembly work can be completed without causing the optical fibers 2-1 and 2-2 to bend.

[D] Description of the Fourth Embodiment

Figure 10:
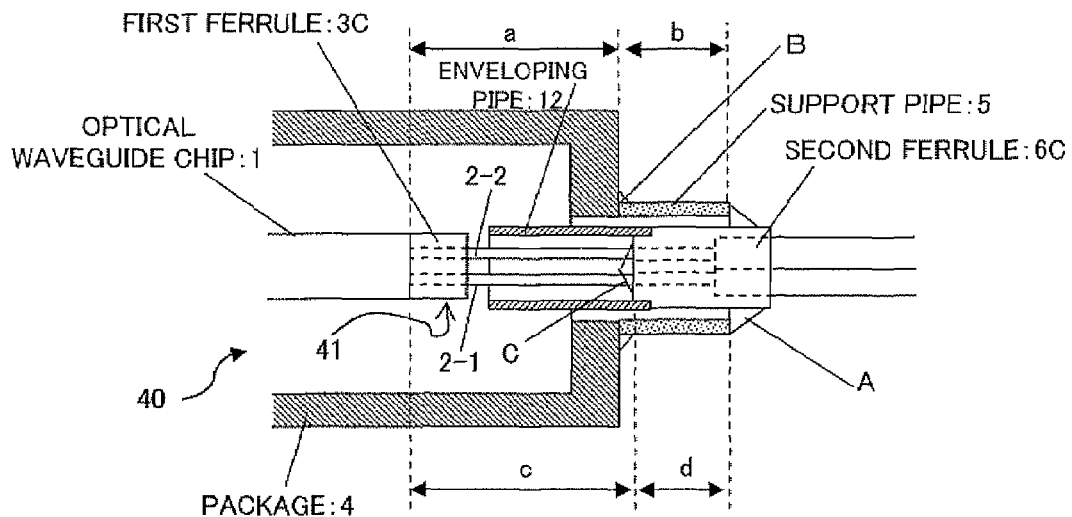
FIG. 10 is a schematic top view showing an optical waveguide device according to a fourth embodiment of the present invention.

FIG. 10 is a schematic top view showing an optical waveguide device 40 according to the fourth embodiment of the present invention. The optical waveguide device 40 shown in FIG. 10 is different from the optical waveguide device 20 in the second embodiment described above in that the 2-core optical fibers 2-1 and 2-2 are used for conduction. Accordingly, two fiber insertion holes are provided in first and second ferrules 3C and 6C respectively (See numerals 6-1 and 6-2 shown in FIG. 12 with respect to the second ferrule 6C). The same numerals in FIG. 10 as those in FIG. 4 denote approximately the same components.

Figure 11:
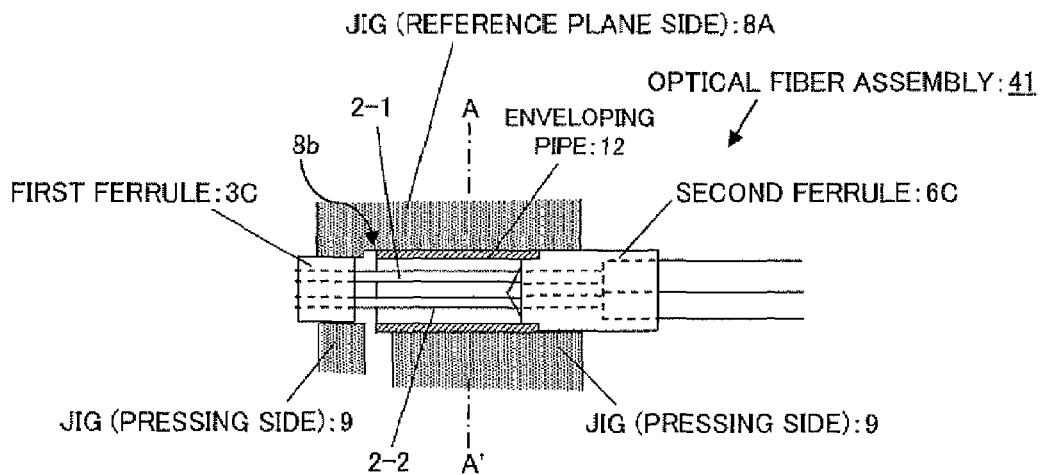
FIG. 11 and FIG. 12 are both diagrams for describing manufacturing processes of the optical waveguide device according to the fourth embodiment of the present invention.
Figure 12:
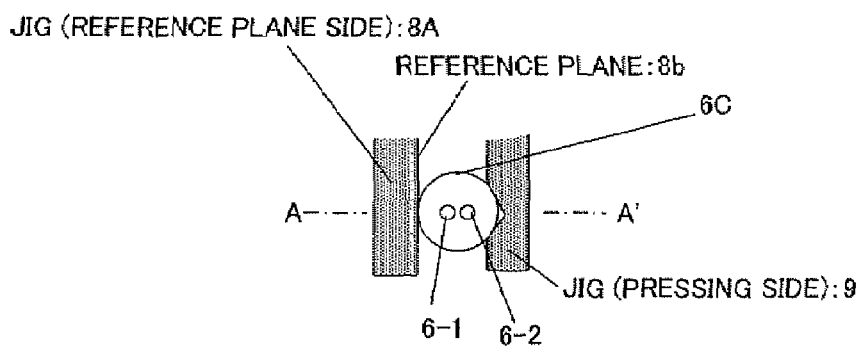

When assembling the optical waveguide device 40 in the fourth embodiment, like the second embodiment (See numeral 21), an optical fiber assembly 41 shown in FIG. 11 is constructed from the first ferrule 3C, second ferrule 6C, enveloping pipe 12, and optical fibers 2-1 and 2-2. FIG. 12 shows an AA' cross section shown in FIG. 11. As shown in FIG. 11 and FIG. 12, the reference plane 8b for constructing the optical fiber assembly 41 is selected to be approximately perpendicular to the alignment plane of the optical fibers 2-1 and 2-2. That is, the plane in which the first ferrule 3C and second ferrule 6C are gripped by the jigs 8A and 9 is selected to be perpendicular to the optical fiber alignment plane.

When an optical fiber array having a plurality of optical fibers like the fourth embodiment is applied, the highest level of accuracy is required for relative deviation of the first ferrule 3C and second ferrule 6C in an optical fiber alignment plane. Thus, the relative deviation can be controlled effectively, and therefore the allowable bending radius of the optical fiber can reliably be secured also for a multi-core structure.

Thus, also in the optical waveguide device 40 according to the fourth embodiment, in addition to advantages like those of the second embodiment described above, an advantage of being able to reliably secure the allowable bending radius of the optical fibers can be obtained from the multi-core structure.

[D1] Concrete Configuration Aspect

Next, a concrete configuration aspect of the optical waveguide device 40 according to the fourth embodiment will be described. Material and dimensions of each component can be selected, for example, as described below to satisfy the thermal expansion design.

The material SUS304 is used for the package 4 and Invar, whose thermal expansion is small, for the support pipe 5. Aluminum, whose thermal expansion is larger than that of the package 4, is used as a material of the second ferrule 6C.

Then, the length of each component is set as follows: That is, the length of the package 4 is 10 mm, that of the support pipe 5 (Invar) is 7.5 mm, that of the optical fibers 2-1 and 2-2 (including a portion inserted through the first ferrule 3C) is 10 mm, and that of the second ferrule 6C is 7.5 mm.

The thermal expansion coefficient of each material is as follows: The thermal expansion coefficient of SUS304 constituting the package 4 is $\alpha 1=17.3\times 10^{-6}$ (/K), that of Invar constituting the support pipe 5 is $\alpha 2=1.2\times 10^{-6}$ (/K), that of the glass constituting the optical fibers 2-1 and 2-2 and the first ferrule 3C is $\alpha 3=0.5\times 10^{-6}$ (/K), and that of the aluminum constituting the second ferrule 6C is $\alpha 4=23.6\times 10^{-6}$ (/K). If the range of temperature is $-40$ to $85°$ C. and the reference temperature is $25°$ C., which is the temperature during device production, the maximum temperature difference $\Delta T$ will be $65°$ C. ($25°$ C.$\rightarrow-40°$ C.).

Calculation of the amount of expansion or contraction $\Delta L1$ on the package 4 side according to Formula (1) under these set conditions yields $\Delta L1=(17.3\times 10^{-6}\times 10+1.2\times 10^{-6}\times 7.5)\times 65=11.8$ µm and calculation of the amount of expansion or contraction $\Delta L2$ on the optical fibers 2-1 and 2-2 side according to Formula (2) yields $\Delta L2=(0.5\times 10^{-6}\times 10+23.6\times 10^{-6}\times 7.5)\times 65=11.8$ µm.

Thus, by achieving thermal expansion matching by matching the first amount of expansion or contraction $\Delta L1$ caused by thermal expansion on the package 4 side and the second expansion or contraction $\Delta L2$ caused by thermal expansion on the optical fibers 2-1 and 2-2 side, no tensile stress or compressive stress caused by thermal expansion or contraction will be applied to the connection fixed part of the optical waveguide and the optical fibers 2-1 and 2-2.

Also, like the third embodiment, the second ferrule 6C was selected as a cylinder with the external diameter of 3.5 mm and the support pipe 5 with the internal diameter of 4.3 mm. The second ferrule 6C is positioned and fixed inside the support pipe 5 so that the allowable bending radius of the optical fibers 2-1 and 2-2 is secured. The method of positioning (adjustments of the bending radius of the optical fibers 2-1 and 2-2)/fixing the second ferrule 6C will be described in the assembly method described next.

First, a description of assembly of the optical fiber assembly 41 is provided. The first ferrule 3C is constructed of a V-groove substrate with 500-µm pitch and 2 mm was selected as a width thereof, which is smaller than the external diameter of the second ferrule 6C. For the enveloping pipe 12, the external diameter was set to 3.5 mm, which is the same as that of the second ferrule 6C, and the internal diameter was set to 3 mm, which is larger than the external diameter of the first ferrule 3C. A step is provided to the tip part of the second ferrule 6C so that the enveloping pipe 12 can be press-fitted.

A portion of the external diameter ridgeline of the first ferrule 3C, that of the second ferrule 6C, and that of the enveloping pipe 12 are brought into contact with the jig 8A that is in contact with the reference plane 8b, as shown in FIG. 11, and the opposite side is pressed by, for example, the jig 9 in the V-groove shape after the enveloping pipe 12 is press-fitted into the second ferrule 6C. In this state, the optical fibers 2-1 and 2-2 are inserted through the first ferrule 3C and second ferrule 6C. At this point, the relative position and hole size of the optical fiber 2-1, 2-2 insertion holes provided in the first ferrule 3C and second ferrule 6C are set so that neither "bending (deflection) by position deviation" nor "bending (deflection) by buckling" is caused in the optical fibers 2-1 and 2-2 (like the third embodiment). That is, the optical fibers 2-1 and 2-2 without bending are inserted through the first ferrule 3C and second ferrule 6C. In this state, for example, the first ferrule 3C and the optical fibers 2-1 and 2-2 are fixed by an epoxy adhesive and the optical fibers 2-1 and 2-2 and the second ferrule 6C are airtightly fixed by solder. At this point, the enveloping pipe 12 can have a split form to facilitate an adhesion/fixing process and holes may be provided in a portion of the side of the enveloping pipe 12. Subsequently, the jigs 8A and 9 are removed to complete the optical fiber assembly 41.

Next, the optical fiber assembly 41 is inserted into the package 4 from the support pipe 5. Then, the first ferrule 3C and the enveloping pipe 12 (indirectly the second ferrule 6C) are directly gripped inside the package 4 according to the identical positioning method (See FIG. 11) using the above-described reference plane.

Here, the length of the enveloping pipe 12 is set in consideration of the above-described thermal expansion matching design so that the first ferrule 3C and the enveloping pipe 12 can be gripped inside the package 4. The length of the package 4 is set to 10 mm, the thickness of the package 4 sidewall to 1.5 mm, and the length of the optical fibers 2-1 and 2-2 (including the first ferrule 3C) to 10 mm in the fourth embodiment, and therefore the length of the second ferrule 6C positioned inside the package 4 becomes only 0 mm and the second ferrule 6C cannot be gripped. Thus, the enveloping pipe 12 is mounted at the tip of the second ferrule 6C. The length of the enveloping pipe 12 positioned inside the package 4 is set to 5 mm so that the enveloping pipe 12 can be gripped inside the package 4.

Since the optical fiber assembly 41 is assembled so that the optical fibers 2-1 and 2-2 will not be bent when the first ferrule 3C, second ferrule 6C, and enveloping pipe 12 are in contact with the reference plane 8b, as described above, a state in which the optical fibers 2-1 and 2-2 are not bent can be reproduced by gripping the optical fiber assembly 41 according to the method using the identical reference plane. That is, only by directly gripping the first ferrule 3C and the enveloping pipe 12 (indirectly the second ferrule 6C) inside the package 4 without making any relative position adjustments of the first ferrule 3C and second ferrule 6C, the optical fibers 2-1 and 2-2 can unconditionally be put into a state in which the allowable bending radius is secured.

Thus, optical axis adjustments of the optical fibers 2-1 and 2-2 are made for the optical waveguide while the first ferrule 3C and the enveloping pipe 12 (indirectly the second ferrule 6C) are directly gripped inside the package 4. At this point, the second ferrule 6C is arranged inside the support pipe 5 and the internal diameter of the support pipe 5 is set a little larger than the external diameter of the second ferrule 6C, and therefore the optical axis adjustments of the optical fibers 2-1 and 2-2 can be made without collision of the second ferrule 6C into the support pipe 5. After the optical axis adjustments are made, the optical fibers 2-1 and 2-2 and the optical waveguide are fixed via the first ferrule 3C by, for example, a UV adhesive. Subsequently, the tip of the support pipe 5 and the second ferrule 6C are airtightly fixed while the first ferrule 3C and second ferrule 6C are gripped. By fixing the second ferrule 6C while maintaining the position after the optical axis adjustments, assembly work can be completed without causing the optical fibers 2-1 and 2-2 to bend.

[E] Others

Regardless of the embodiments described above, the present invention can be carried out in various modifications without deviating from the scope of the present invention.

For example, in the second embodiment, connection of the 2-core optical fibers 2-1 and 2-2 to the optical waveguide chip 1 inside the package 4 was described in detail, but according to the present invention, optical fibers of a multi-core array having more cores than two cores can be applied in a similar manner. Also in this case, particularly by selecting the reference plane in which the first and second ferrules are gripped as a plane substantially perpendicular to the alignment direction of a plurality of cores constituting a multi-core array, positioning for connection work and optical axis adjustments can easily be performed with high accuracy while suppressing fiber bending.

With disclosures of the foregoing embodiments, those skilled in the art will be able to produce a device of the present invention.

What is claimed is:

1. An optical device, comprising:
an optical element chip on which an optical element is formed;
an optical fiber assembly comprised of an optical fiber adapted to optically connect to the optical element, a first ferrule mounted at a tip of the optical fiber to connect and fix the optical element and the optical fiber, a second ferrule mounted on the optical fiber on an inner side from the first ferrule, and an enveloping pipe mounted on the second ferrule on the side of the first ferrule to envelop the optical fiber;
a package containing and enveloping the optical element chip and having an opening for introducing the optical fiber assembly; and
a support pipe mounted on an extension of the opening to support an introductory part of the optical fiber into the package together with the second ferrule constituting the optical fiber assembly to be introduced into the package and to hermetically seal the package, wherein
the second ferrule is fixed inside the support pipe, one end thereof substantially protrudes at a tip part of the support pipe by a length required for the airtight fixing, and the enveloping pipe protrudes toward an inner part of the package.

2. The optical device according to claim 1, wherein the first ferrule and the enveloping pipe are constructed so that a portion of an external diameter ridgeline of the first ferrule and that of the enveloping pipe inside the package are in contact with an identical reference plane.

3. An optical device, comprising: an optical waveguide chip on which an optical waveguide is formed, an optical fiber optically connected to the optical waveguide, a first ferrule to connect and fix the optical waveguide chip and the optical fiber, a package containing the optical waveguide chip and the first ferrule and having an opening for passing the optical fiber to an outside provided on a sidewall, a first pipe airtightly fixed around the opening, a second ferrule that has an external diameter smaller than an internal diameter of the first pipe and is inserted into the first pipe to be airtightly fixed to a tip of the first pipe and through which the optical fiber passing through the opening to come out of the package is inserted for airtight fixing, and a second pipe mounted at a tip part of the second ferrule leading to an inner part of the package, wherein
the second ferrule has the external diameter smaller than the internal diameter of the first pipe, and
the second pipe has a sufficient length so that at least a portion thereof protrudes from an inner wall of the package and the second ferrule is sufficiently long so that a length required for the airtight fixing substantially protrudes from the first pipe.

4. A method of manufacturing an optical device, the device comprising: an optical element chip on which an optical element is formed; an optical fiber assembly comprised of an optical fiber adapted to optically connect to the optical element, a first ferrule mounted at a tip part of the optical fiber to connect and fix the optical element and the optical fiber, and a second ferrule mounted on the optical fiber on an inner side from the first ferrule; a package containing and enveloping the optical element chip and having an opening for introducing the optical fiber assembly; and a support pipe mounted on an extension of the opening to support an introductory part of the optical fiber into the package together with the second ferrule constituting the optical fiber assembly to be introduced into the package and to hermetically seal the package, wherein the second ferrule is fixed inside the support pipe, one end thereof protrudes toward an inner part of the package, and another end substantially protrudes at a tip part of the support pipe by a length required for the airtight fixing, the method comprising the steps of:

assembling the optical fiber assembly by fixing the first ferrule, the optical fiber, and the second ferrule;

inserting the optical fiber assembly into the package containing the optical element chip from the support pipe, and making optical axis adjustments of the optical element chip and the optical fiber by gripping the first ferrule and the second ferrule simultaneously so that the optical fiber has a radius equal to or greater than an allowable bending radius;

fixing the optical element chip and the first ferrule after making the optical axis adjustments; and airtightly fixing the second ferrule to a tip of the support pipe while maintaining a position after the optical axis adjustments.

5. The method of manufacturing an optical device according to claim 4, wherein the first ferrule and the second ferrule are fixed to the optical fiber in a state in which a portion of an external diameter ridgeline of the first ferrule and that of the second ferrule are in contact with an identical reference plane when assembling the optical fiber assembly, and optical axis adjustments of the optical element chip and the optical fiber are made while the first ferrule and the second ferrule are gripped inside the package to maintain a state in which a portion of the external diameter ridgeline of the first ferrule and that of the second ferrule are in contact with the identical reference plane after inserting the optical fiber assembly into the package.

6. The method of manufacturing an optical device according to claim 4, wherein the first ferrule and the second ferrule are fixed to the optical fiber in a state in which both ferrules are simultaneously gripped using a jig having a preset reference plane when assembling the optical fiber assembly, and the optical axis adjustments are made while the first ferrule and the second ferrule are gripped inside the package simultaneously using the jig when connecting the optical fiber constituting the optical fiber assembly to the optical element.

7. The method of manufacturing an optical device according to claim 5, wherein the optical fiber has a multicore array structure, and the reference plane is a plane substantially perpendicular to an alignment direction of a plurality of cores constituting the multicore array.

8. The method of manufacturing an optical device according to claim 6, wherein the optical fiber has a multicore array structure, and the reference plane is a plane substantially perpendicular to an alignment direction of a plurality of cores constituting the multicore array.

9. A method of manufacturing an optical device, the device comprising: an optical element chip on which an optical element is formed; an optical fiber assembly comprised of an optical fiber adapted to optically connect to the optical element, a first ferrule mounted at a tip part of the optical fiber to connect and fix the optical element and the optical fiber, a second ferrule mounted on the optical fiber on an inner side from the first ferrule, and an enveloping pipe mounted on the second ferrule on the side of the first ferrule to envelop the optical fiber; a package containing and enveloping the optical element chip and having an opening for introducing the optical fiber assembly; and a support pipe mounted on an extension of the opening to support an introductory part of the optical fiber into the package together with the second ferrule constituting the optical fiber assembly to be introduced into the package and to hermetically seal the package, wherein the second ferrule is fixed inside the support pipe, one end thereof substantially protrudes at a tip part of the support pipe by a length required for the airtight fixing, and the enveloping pipe protrudes toward an inner part of the package, the method comprising the steps of:

assembling the optical fiber assembly by fixing the first ferrule, the optical fiber, and the second ferrule to which the enveloping pipe is mounted;

inserting the optical fiber assembly into the package containing the optical element chip from the support pipe airtightly fixed around the opening, and making optical axis adjustments of the optical element chip and the optical fiber by gripping the first ferrule and the enveloping pipe simultaneously so that the optical fiber has a radius equal to or greater than an allowable bending radius;

fixing the optical element chip and the first ferrule after making the optical axis adjustments; and airtightly fixing the second ferrule to a tip of the support pipe while maintaining a position after the optical axis adjustments.

10. The method of manufacturing an optical device according to claim 9, wherein the first ferrule and the enveloping pipe are fixed in a state in which a portion of an external diameter ridgeline of the first ferrule and that of the enveloping pipe are in contact with an identical reference plane when assembling the optical fiber assembly, and optical axis adjustments of the optical element chip and the optical fiber are made while the first ferrule and the enveloping pipe are gripped inside the package to maintain a state in which a portion of the external diameter ridgeline of the first ferrule and that of the second ferrule are in contact with the identical reference plane after inserting the optical fiber assembly into the package.

11. The method of manufacturing an optical device according to claim 10, wherein the first ferrule and the enveloping pipe are fixed to the optical fiber in a state in which both the ferrule and enveloping pipe are simultaneously gripped using a jig having a preset reference plane when assembling the optical fiber assembly, and the optical axis adjustments are made while the first ferrule and the enveloping pipe are gripped inside the package simultaneously using the jig when connecting the optical fiber constituting the optical fiber assembly to the optical element.

12. The manufacturing method of an optical device according to claim 10, wherein the optical fiber has a multicore array structure, and the reference plane is a plane substantially perpendicular to an alignment direction of a plurality of cores constituting the multicore array.

13. The manufacturing method of an optical device according to claim 11, wherein the optical fiber has a multicore array structure, and the reference plane is a plane substantially perpendicular to an alignment direction of a plurality of cores constituting the multicore array.

* * * * *